(12) United States Patent
Wu et al.

(10) Patent No.: US 11,830,356 B2
(45) Date of Patent: Nov. 28, 2023

(54) INTERACTIVE CORD WITH IMPROVED CAPACITIVE TOUCH SENSING

(71) Applicant: Google LLC, Mountain View, CA (US)

(72) Inventors: Tong Wu, Mountain View, CA (US); Munehiko Sato, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 724 days.

(21) Appl. No.: 17/008,155

(22) Filed: Aug. 31, 2020

(65) Prior Publication Data

US 2022/0068119 A1 Mar. 3, 2022

(51) Int. Cl.
| | | |
|---|---|---|
| *G08C 19/00* | (2006.01) | |
| *H04M 1/72409* | (2021.01) | |
| *D03D 1/00* | (2006.01) | |
| *D03D 15/533* | (2021.01) | |
| *D07B 1/14* | (2006.01) | |

(52) U.S. Cl.
CPC ........... *G08C 19/00* (2013.01); *D03D 1/0088* (2013.01); *D03D 15/533* (2021.01); *D07B 1/147* (2013.01); *H04M 1/72409* (2021.01); *D07B 2201/2036* (2013.01); *D10B 2403/02431* (2013.01); *G08C 2201/30* (2013.01)

(58) Field of Classification Search
CPC .. G08C 19/00; G08C 2201/30; D03D 1/0088; D03D 15/533; D07B 1/147; D07B 2201/2036; H04M 1/72409; D10B 2403/02431
See application file for complete search history.

(56) References Cited

U.S. PATENT DOCUMENTS

| | | | |
|---|---|---|---|
| 3,612,744 A * | 10/1971 | Thomas ............... | H01B 7/0838 174/117 FF |
| 9,652,091 B1 | 5/2017 | Obeidat | |
| 10,047,459 B1 * | 8/2018 | Starner ............... | H01B 7/1865 |
| 10,268,321 B2 * | 4/2019 | Poupyrev ................ | G06F 1/163 |
| 10,492,302 B2 * | 11/2019 | Karagozler ............ | A41D 1/005 |
| 2005/0231207 A1 * | 10/2005 | Goldwater ............. | D07B 1/145 324/522 |
| 2007/0117445 A1 * | 5/2007 | Yamaura .............. | H03K 17/962 439/404 |
| 2014/0070957 A1 | 3/2014 | Longinotti-Buitoni et al. | |
| 2017/0115777 A1 * | 4/2017 | Poupyrev ............ | G06F 3/04883 |
| 2018/0258562 A1 | 9/2018 | Fukuhara | |
| 2018/0310659 A1 * | 11/2018 | Poupyrev ............. | A63B 43/004 |
| 2019/0004635 A1 * | 1/2019 | Sawyer ................ | H04R 1/1041 |
| 2019/0380613 A1 * | 12/2019 | Prot ........................ | A61B 5/291 |
| 2022/0056762 A1 * | 2/2022 | Hu ......................... | H01H 36/00 |
| 2022/0068119 A1 * | 3/2022 | Wu ......................... | G08C 19/00 |
| 2022/0179518 A1 | 6/2022 | Sato et al. | |

FOREIGN PATENT DOCUMENTS

WO WO2016/053624 4/2016

* cited by examiner

*Primary Examiner* — Dmitriy Bolotin
(74) *Attorney, Agent, or Firm* — Dority & Manning, P.A.

(57) ABSTRACT

An interactive cord system can include sensing circuitry coupled to a system ground and an interactive cord. The interactive cord can include a plurality of non-conductive lines a plurality of conductive sensing lines at least partially woven with one or more of the plurality of non-conductive lines to form at least one touch-sensitive area along the interactive cord and one or more conductive grounding lines electrically connected with the system ground and extending at least partially along an outer portion of the interactive cord.

20 Claims, 28 Drawing Sheets

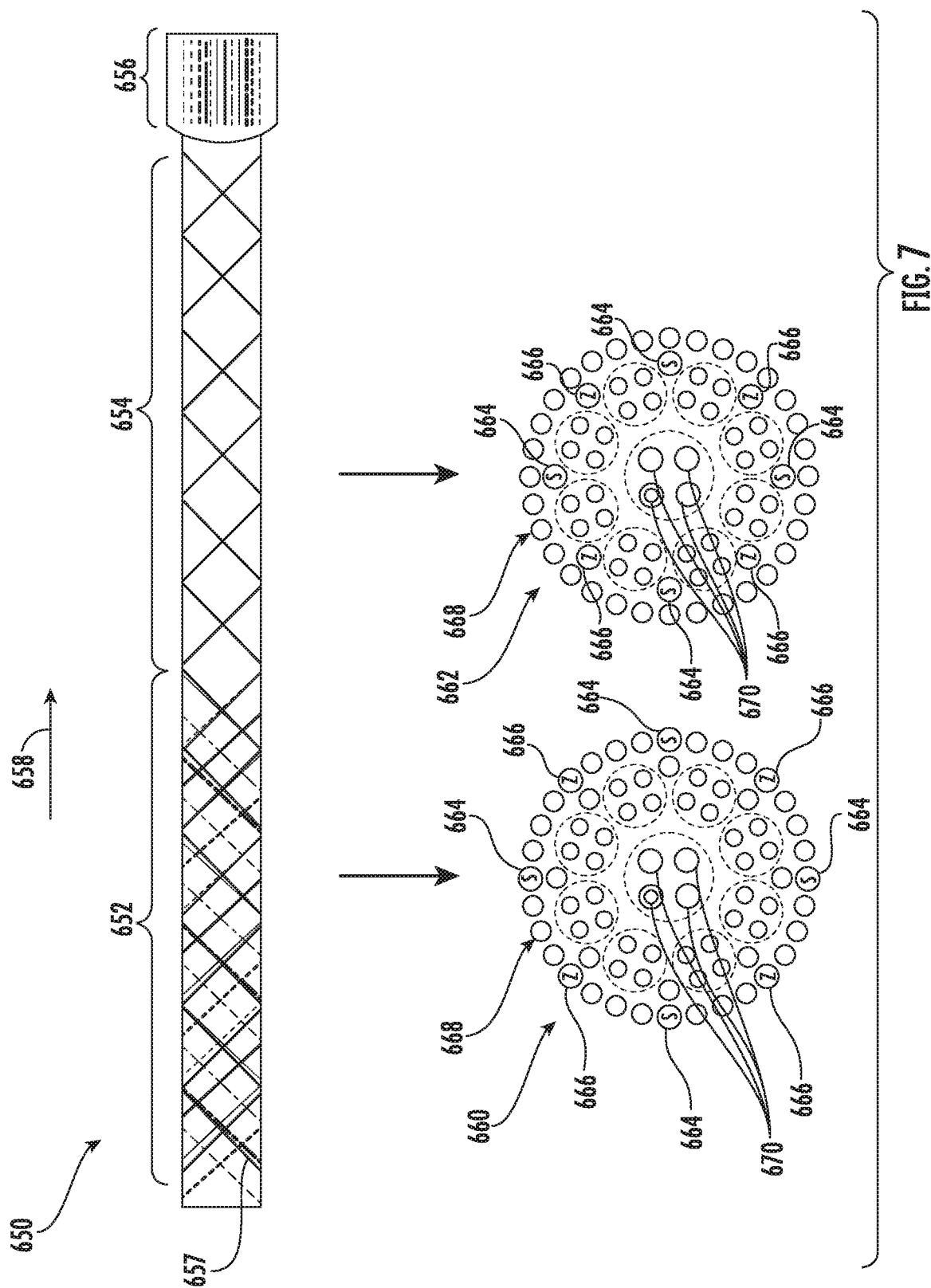

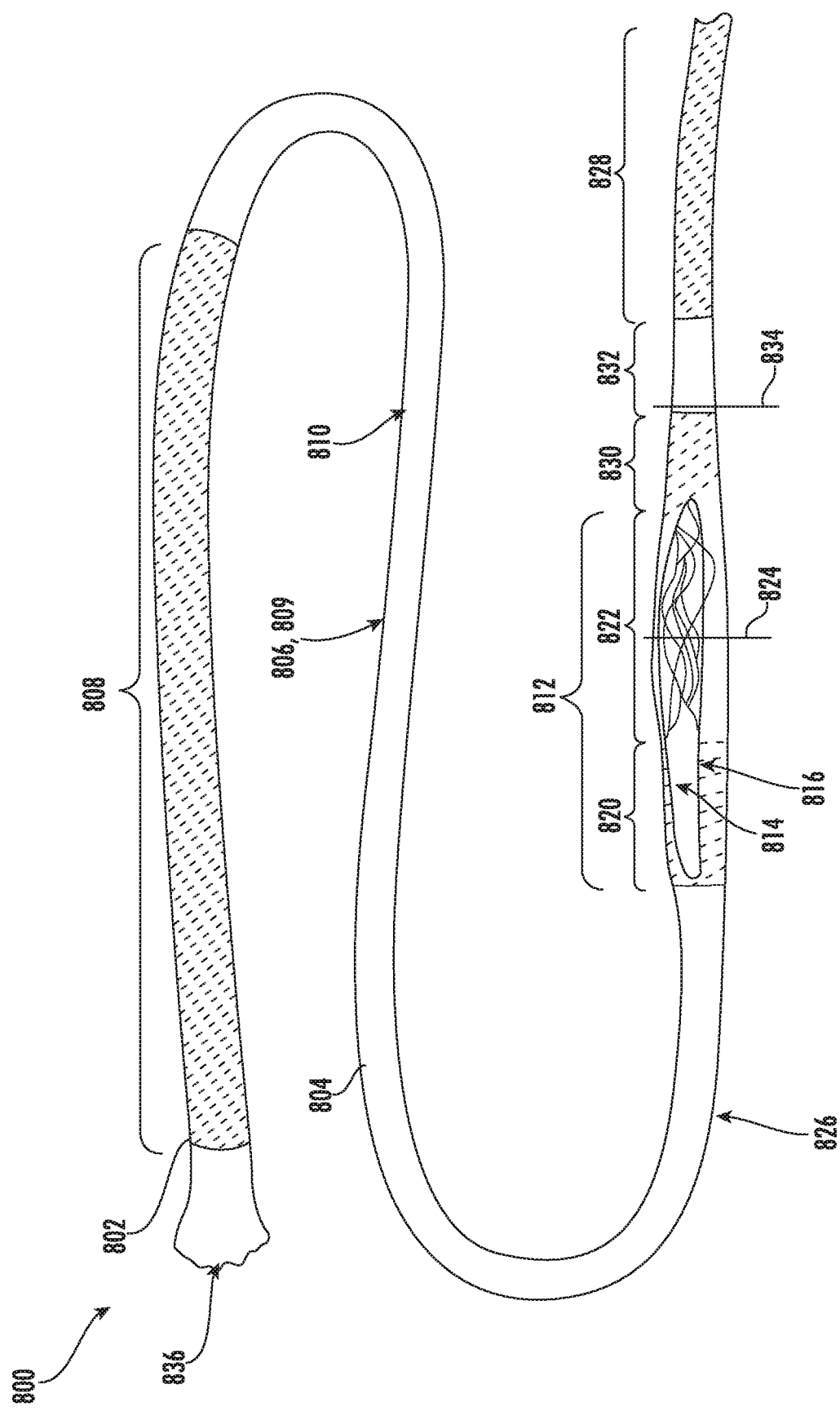

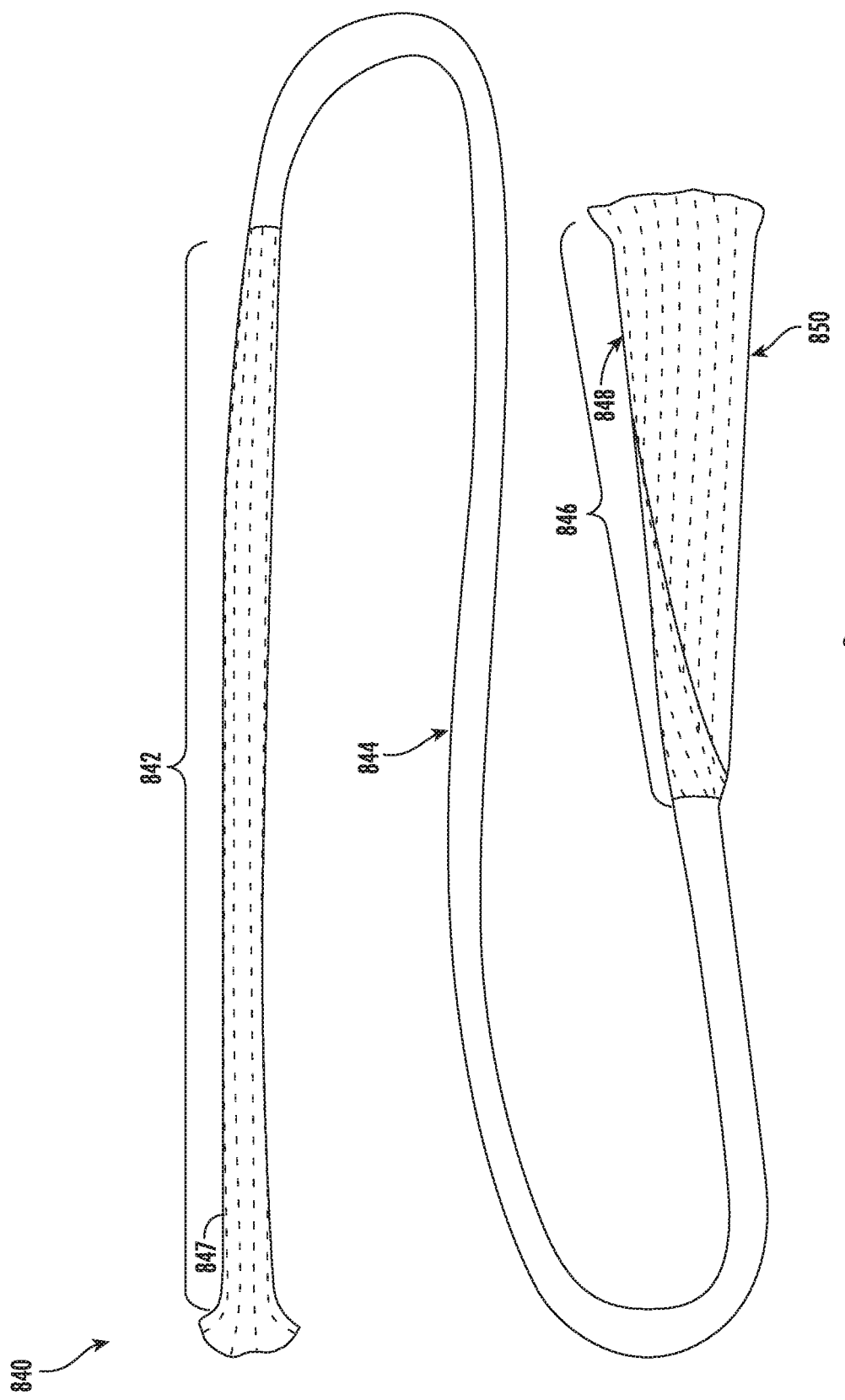

INTERACTIVE CORD WITH IMPROVED CAPACITIVE TOUCH SENSING

FIELD

The present disclosure relates generally to interactive objects including touch-sensors.

BACKGROUND

In-line controls for cords are common for devices including earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

Accordingly, there remains a need for cords that can provide an adequate interface for controlling devices. Additionally, there remains a need for manufacturing processes that can efficiently and effectively manufacture such objects.

SUMMARY

Aspects and advantages of embodiments of the present disclosure will be set forth in part in the following description, or may be learned from the description, or may be learned through practice of the embodiments.

Aspects of the present disclosure are directed to an interactive cord system including sensing circuitry coupled to a system ground. The interactive cord system can include an interactive cord. The interactive cord can include a plurality of non-conductive lines and a plurality of conductive sensing lines at least partially woven with one or more of the plurality of non-conductive lines to form at least one touch-sensitive area along the interactive cord. The interactive cord system can include one or more conductive grounding lines electrically connected with the system ground and extending at least partially along an outer portion of the interactive cord.

Another aspect of the present disclosure is directed to an interactive object including sensing circuitry coupled to a system ground. The interactive object can include an interactive cord, a plurality of non-conductive lines, and a plurality of conductive sensing lines at least partially woven with one or more of the plurality of non-conductive lines to form at least one touch-sensitive area along the interactive cord. The interactive object can include a grounding object configured to provide capacitive coupling with a user of the interactive object. The grounding object can be electrically connected with the system ground of the sensing circuitry.

Another aspect of the present disclosure is directed to a method for forming an interactive cord system. The method can include forming a plurality of conductive sensing lines together with one or more of a plurality of non-conductive lines to form a touch-sensitive area of an interactive cord; arranging one or more conductive grounding lines to extend at least partially along the interactive cord in a longitudinal direction of the interactive cord; and directly electrically connecting the one or more conductive grounding lines with a system ground of sensing circuitry configured to detect a change in capacitance associated with the plurality of conductive sensing lines.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 illustrates an interactive cord including a first longitudinal portion. a second longitudinal portion, and a third longitudinal portion according to aspects of the present disclosure.

FIG. 8 illustrates an embodiment of an interactive cord according to aspects of the present disclosure.

FIG. 9 illustrates another embodiment of an interactive cord according to aspects of the present disclosure.

DETAILED DESCRIPTION

Figure 1A:
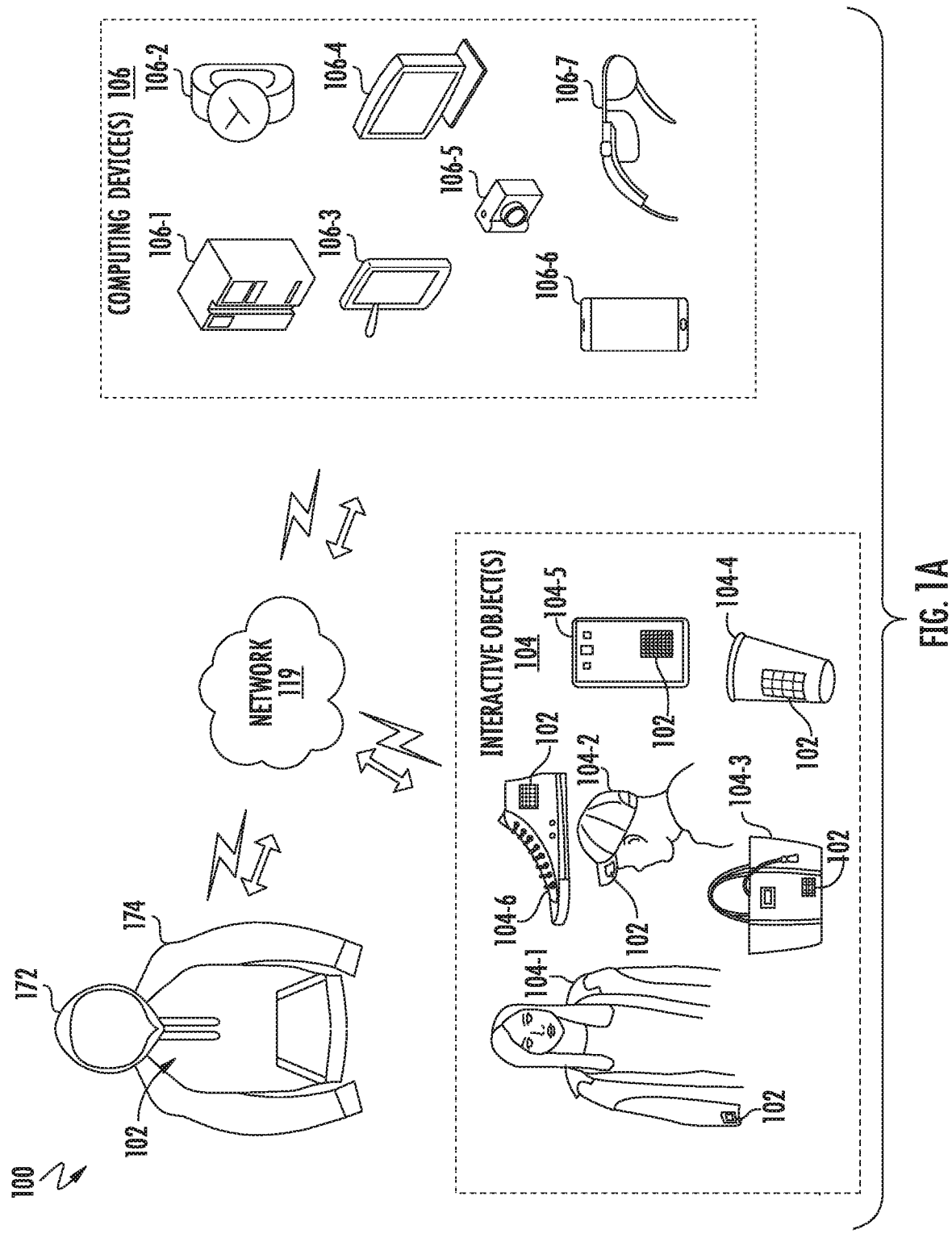
FIG. 1A illustrates an example of a computing environment including an interactive cord in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a touch-sensitive braided cord having an improved grounding configuration. An interactive cord can be configured to detect a user input gesture along one or more touch-sensitive areas of the interactive cord. For example, a user's finger or hand can alter a capacitance associated with one or more conductive lines extending along the interactive cord. In some embodiments, the interactive cord can include one or more transmitter conductive lines and one or more receiver conductive lines. A signal can be applied to the transmitter conductive line(s). The user's finger touching or being near the interactive cord can alter a mutual capacitance between the transmitter conductive line(s) and the receiver conductive line(s). For example, the presence of the user's finger can decrease the mutual capacitance, which can be detected by sensing circuitry to detect the user input gesture.

However, such changes in mutual capacitance caused by the user's finger can be relatively small if the electrical potential of the user's finger is substantially different than the sensor ground. Further, the user may pinch or otherwise compress the cord, which can decrease a gap between the transmitter conductive line(s) and the receiver conductive line(s) result in an increase in mutual capacitance. These two effects on the mutual capacitance can act against each other, degrading signal fidelity and/or resolution with respect to detecting and/or identifying user input gestures (e.g., pinch, roll, slide, etc.). In accordance with example embodiments of the present disclosure, grounding techniques are provided that can address this issue. More particularly, grounding as described herein can increase the effect of the presence of the user's finger on or near the interactive cord such that the resulting reduction in mutual capacitance is not effectively offset or countered by compression of the interactive cord. Experimental data illustrating these effects and findings are discussed below with reference to FIGS. 19A through 20B. As such, the grounding configurations and techniques described herein can improve detection and/or identification of user input gestures with respect to the interactive cord.

In some embodiments, an interactive cord system can include sensing circuitry coupled to a system ground and an interactive cord. The interactive cord can include a plurality of non-conductive lines and a plurality of conductive sensing lines at least partially woven with one or more of the plurality of non-conductive lines to form at least one touch-sensitive area along the interactive cord. In some embodiments, one or more conductive grounding lines can be electrically connected with the system ground and can extend at least partially along an outer portion of the interactive cord. The conductive grounding line(s) can improve the sensitivity of the interactive cord to the presence of a user's hand or finger.

In some embodiments, the system ground can be or include a floating ground. For example, the system ground can be free of connection with another ground. The system ground can be free of contact and/or capacitive coupling with an earth ground and/or a user, which can act as a ground. In some embodiments, the sensing circuitry can include a metal body, such as a block, sheet, foil, or the like. Examples of suitable metals can include copper, silver, gold, aluminum, tin, nickel, steel, and/or alloys thereof. Thus, the conductive grounding line(s) can be at the same electrical potential as the system ground.

In other embodiments, the system ground can be configured to electrically connect and/or provide capacitive coupling with a user of the interactive cord system. The user can act as an earth ground, such that the conductive grounding line(s) are electrically connected and/or capacitively coupled with the user of the interactive cord system to ground the conductive grounding line(s). Thus, the conductive grounding line(s) can be at the same electrical potential as the user of the interactive cord system.

In some embodiments, the interactive cord can be included in a garment, for example as a drawstring of a sweatshirt, sweatpants, athletic shorts or the like. A grounding object can be configured to provide capacitive coupling with a user and/or wearer of the interactive cord system and/or garment. The system ground can be directly electrically connected with the grounding object to provide an electrical connection and/or provide capacitive coupling between the conductive grounding line(s) and the wearer of the garment.

The grounding object can be or include a variety of suitable conductive objects, such as a conductive block, conductive fibers, conductive foil or the like. For instance, the grounding object can include a metal foil configured to contact or provide capacitive coupling with the wearer of the garment. In some embodiments, the grounding object can be or include a grounding fabric. The grounding fabric can include a plurality of conductive fibers woven together with each other and/or other fibers (e.g., non-conductive fibers). The grounding object can be coupled to the garment such that the grounding object is arranged near the wearer to provide capacitive coupling with the wearer of the garment to ground the grounding fabric with respect to the user. For example, the grounding object can be separated from the user by a thin layer of fabric, insulation or the like. The grounding object can form a capacitor between the grounding fabric and the wearer/user. For example, the grounding object be or include relatively large and flat, such as a sheet, foil, plate or the like of conductive material. However, in some embodiments the grounding fabric can directly contact the wearer/user to directly electrically connect the system ground with the wearer.

As examples, the grounding object can be arranged on an inside surface of a garment. Example locations for the grounding object can include an inside surface of a sleeve of the garment, an inside surface of a pant leg of the garment, an inside surface of a collar of the garment, or the like.

The conductive ground line(s) can extend at least partially along the interactive cord in a longitudinal direction of the interactive cord. For example, the conductive grounding line(s) can be helically wrapped around at least one of the plurality of the non-conductive lines or at least one of the plurality of the conductive sensing lines. For instance, the conductive grounding line(s) can be wrapped around at least an inner core of the interactive cord and/or wrapped around an exterior of the interactive cord. In some embodiments, the conductive grounding line(s) can include a first conductive grounding line helically wrapped clockwise around the interactive cord in a longitudinal direction of the interactive cord and a second conductive grounding line helically wrapped counterclockwise around the interactive cord.

In some embodiments, the conductive ground line(s) can be wrapped around a touch-sensitive area and/or a non-touch-sensitive area of the interactive cord. In the non-touch-sensitive area, the conductive sensing lines can be arranged radially inward from an outer surface of the interactive cord. The conductive ground line(s) can wrap around the interactive cord along the non-touch-sensitive area. The conductive grounding line(s) can be arranged radially outward with respect to the conductive sensing lines, for example as an electric shield for the conductive sensing lines.

The sensing circuitry can be configured to detect a change in mutual capacitance with respect to at least one of the plurality of sensing conductive lines. For instance, the plurality of conductive sensing lines can include a plurality of transmitter lines and a plurality of receiver lines. A signal source, such as a signal generator, a driver or the like, can apply a signal to the transmitter lines, for example with respect to the system ground. The sensing circuitry can include one or more sensing nodes configured to detect mutual capacitance of the receiver lines, for example with respect to the system ground. For instance, the sensing circuitry can detect an electric characteristic, such as voltage difference, current flow, or the like of the receiver line(s) (e.g., with respect to the system ground).

In some embodiments, the sensing circuitry can include an internal electronics module that is integrated into the interactive cord or an object (e.g., garment, hard object) to which the interactive cord is attached. The interactive cord can be directly attached to the internal electronics module or can be attached to the internal electronics module via one or more connector components. The internal electronics module can provide power and/or control signals to the interactive cord. The internal electronics module may not include an on-board power source in some embodiments. Instead, a removable electronics module can supply power to the internal electronics module.

In some examples, the internal electronics module can include a first subset of electronic components, such as one or more drivers configured to provide control signals and/or power to the interactive cord. In some embodiments, a removable electronics module that includes a second subset of electronic components (e.g., a microprocessor, power source, or network interface) can be removably coupled to the interactive object via a communication interface. The communication interface enables communication between the internal electronics module and the removable electronics module when the removable electronics module is coupled to the interactive cord.

In some embodiments, the sensing circuitry can include a removable electronics module removably mounted to a rigid member on the interactive cord or another object (e.g., garment) to which the interactive cord is attached. A connector can include a connecting device for physically and electrically coupling to the removable electronics module. The internal electronics module can be in communication with the connector. The internal electronics module can be configured to communicate with the removable electronics module when connected to the connector. A controller of the removable electronics module can receive information and send commands to the internal electronics module. The communication interface can be configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive cord for charging the power source. Once the power source is charged, the removable electronics module can then be placed back into the interactive cord and electrically coupled to the connector.

In some embodiments, the interactive cord can include a touch-sensitive area and a non-touch-sensitive area. The touch-sensitive area can be formed along a first longitudinal portion of the interactive cord. The plurality of sensing conductive lines can be not exposed along an outer surface of an outer layer of the interactive cord along a second longitudinal portion of the interactive cord to form the non-touch-sensitive area along the second longitudinal portion of the interactive cord.

According to aspects of the present disclosure, an interactive object can include sensing circuitry coupled to a system ground and an interactive cord, for example as described above. The interactive cord can include a plurality of non-conductive lines and a plurality of conductive sensing lines at least partially woven with one or more of the plurality of non-conductive lines to form at least one touch-sensitive area along the interactive cord. A grounding fabric can be configured to provide capacitive coupling with a user of the interactive object. The grounding fabric can be electrically connected with the system ground of the sensing circuitry. The interactive object can be or include a garment (e.g., sweatshirt, pants, shoes, etc.), household appliance, bag, accessory, window treatment, or the like.

Aspects of the present disclosure are directed to a method for forming an interactive cord system. The method can include forming a plurality of conductive sensing lines together with one or more of a plurality of non-conductive lines to form a touch-sensitive area of an interactive cord. The method can include arranging one or more conductive grounding lines to extend at least partially along the interactive cord in a longitudinal direction of the interactive cord. The method can include directly electrically connecting the conductive grounding line(s) with a system ground of sensing circuitry. In some embodiments, the method can include directly electrically connecting the grounding line(s) with a grounding object that is configured to provide capacitive coupling with a user of the interactive cord and/or a wearer of a garment including the interactive cord system.

Figure 1B:
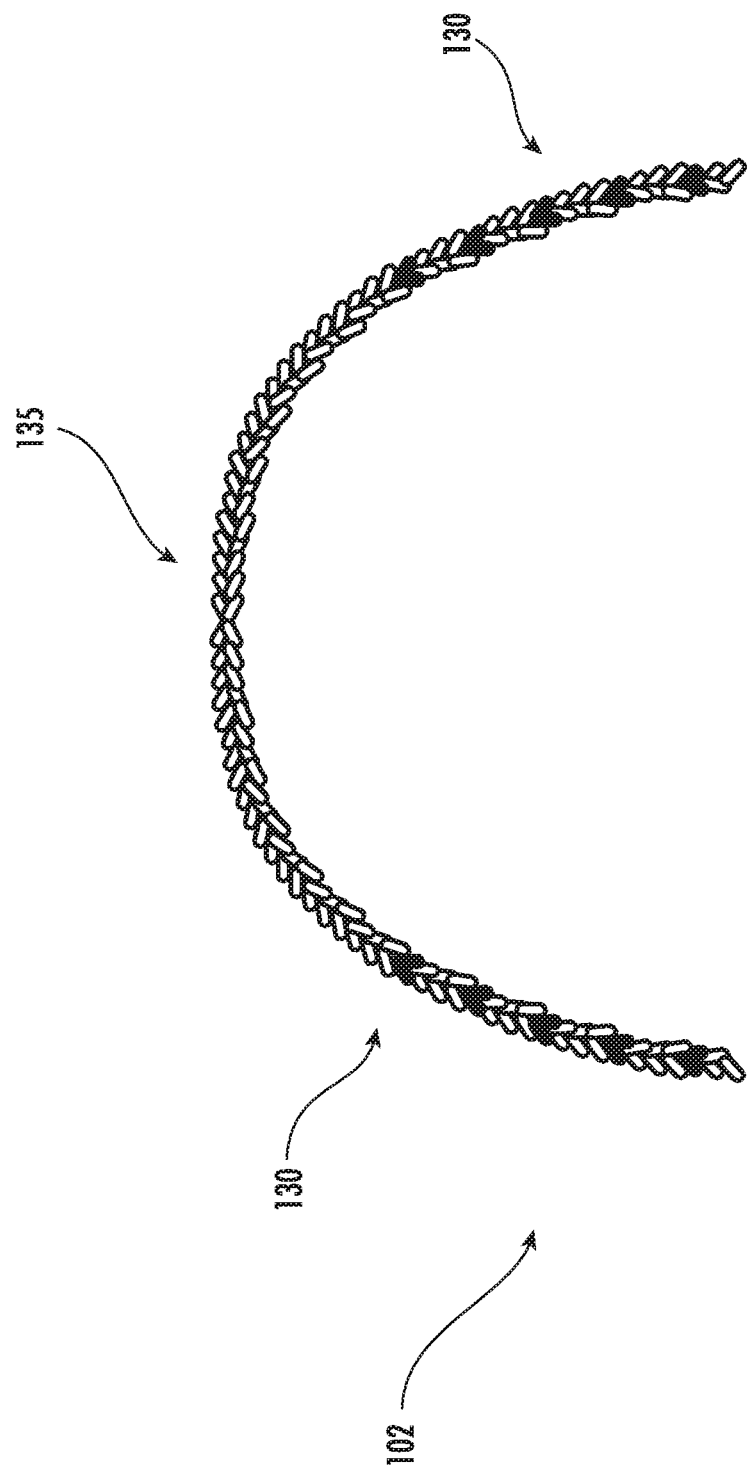
FIG. 1B illustrates an example of a computing environment including an interactive cord in accordance with example embodiments of the present disclosure.

FIG. 1A is an illustration of an example environment 100 in which techniques using, and objects including, an interactive cord in accordance with example embodiments may be implemented. Environment 100 includes an interactive cord 102, which is illustrated as a drawstring for a hoodie or other wearable garment in this particular example. FIG. 1B illustrates an enlarged, simplified view of the interactive cord 102. More particularly, the interactive cord 102 can be formed as a drawstring that extends around a hood 172 of the garment 174. Interactive cord 102 includes one or more touch-sensitive areas 130 including conductive lines configured to detect user input and one or more non-touch-sensitive areas 135 where the conductive lines are configured to not detect touch input due to capacitive sensing. In example computing environment 100, interactive cord 102 includes two touch-sensitive areas 130 and one non-touch-sensitive area 135. It is noted that any number of touch-sensitive areas 130 and/or non-touch-sensitive areas 135 may be included in interactive cord 102. Interactive cord 102 can include touch-sensitive areas 130 where the interactive cord extends from an enclosure of the hood and can include a non-touch-sensitive area 135 where interactive cord 102 wraps around a neck opening of the hood of the garment. In this manner, inadvertent inputs by contact of the user's neck or other portion of their skin with the interactive cord extending around the neck portion can be avoided.

While interactive cord 102 may be described as a cord or string for a garment or accessory, it is to be noted that interactive cord 102 may be utilized for various different types of uses, such as cords for appliances (e.g., lamps or fans), USB cords, SATA cords, data transfer cords, power cords, headset cords, or any other type of cord. In some examples, interactive cord 102 may be a standalone device. For instance, interactive cord 102 may include a communication interface that permits data indicative of input received at the interactive cord to be transmitted to one or more remote computing endpoints, such as a cellphone, personal computer, or cloud computing device. In some implementations, an interactive cord 102 may be incorporated within an interactive object. For example, an interactive cord may form the drawstring of a shirt (e.g., hoodie) or pants, shoelaces, etc.

Interactive cord 102 enables a user to control an interactive object such as garment 174 that the interactive cord 102 is integrated with, or to control a variety of other computing devices 106 via a network 119. Computing devices 106 are illustrated with various non-limiting example devices: server 106-1, smart watch 106-2, tablet 106-3, desktop 106-4, camera 106-5, smart phone 106-6, and computing spectacles 106-7, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

The interactive cord can be included in a variety of objects. Such can include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate touch sensors into hard objects 104.

Network 119 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

The interactive cord(s) 102 can interact with computing devices 106 by transmitting touch data or other sensor data through network 119. Computing device 106 uses the touch data to control computing device 106 or applications at computing device 106. As an example, consider that interactive cord 102 integrated at garment 174 may be configured to control the user's smart phone 106-6 in the user's pocket, desktop 106-4 in the user's home, smart watch 106-2 on the user's wrist, or various other appliances in the user's house, such as thermostats, lights, music, and so forth. For example, the user may be able to swipe up or down on interactive cord 102 integrated within the user's garment 174 to cause the volume on a television to go up or down, to cause the temperature controlled by a thermostat in the user's house to increase or decrease, or to turn on and off lights in the user's house. Note that any type of touch, tap, swipe, hold, or stroke gesture may be recognized by interactive cord 102.

Figure 1C:
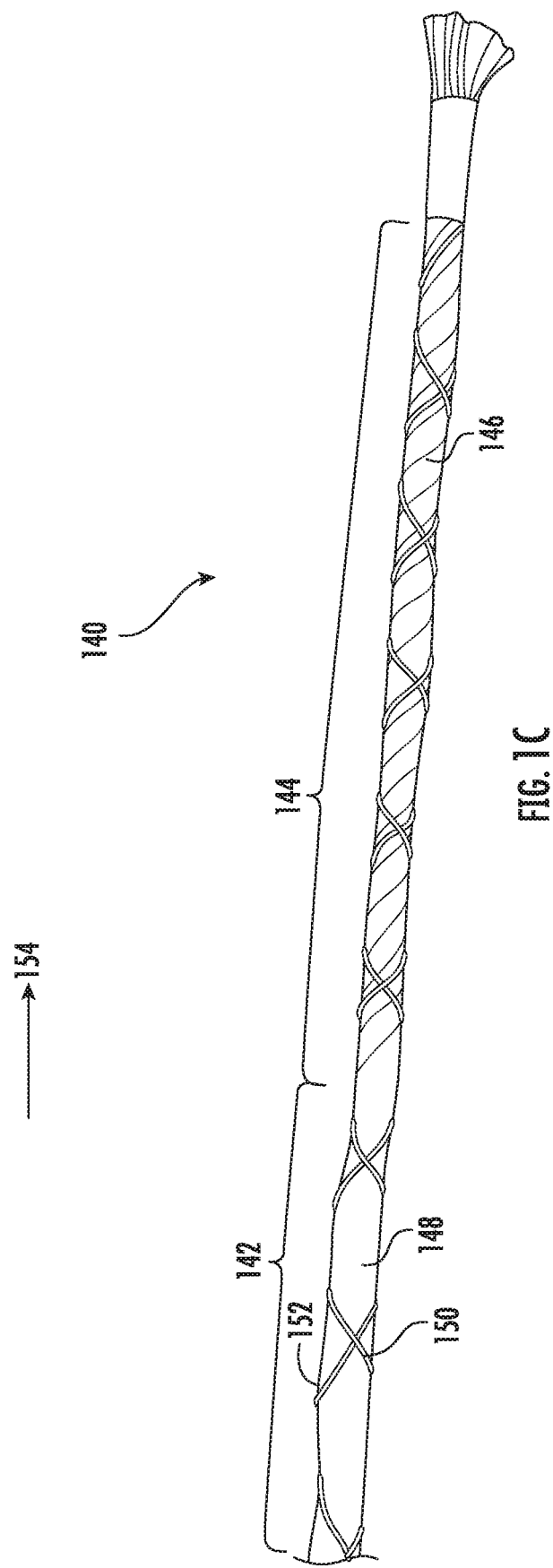
FIG. 1C illustrates an example interactive cord including conductive ground lines according to aspects of the present disclosure.

FIG. 1C illustrates an example interactive cord 140 according to aspects of the present disclosure. The interactive cord 140 can include a non-touch-sensitive area 142 and a touch-sensitive area 144. The interactive cord 140 can include a plurality of conductive sensing lines 146 at least partially woven with one or more of the plurality of non-conductive lines 148 to form the touch-sensitive area 144 along the interactive cord 140. The interactive cord may include one or more conductive ground line(s) 150, 152. The conductive ground line(s) 150, 152 can extend at least partially along the interactive cord 140 in a longitudinal direction 154 of the interactive cord 140. For example, the conductive grounding line(s) 150, 152 can be helically wrapped around at least one of the plurality of the non-conductive lines 148 or at least one of the plurality of the conductive sensing lines 146. For instance, the conductive grounding line(s) 150, 152 can be wrapped around at least an inner core of the interactive cord 140 and/or wrapped around an exterior of the interactive cord 140. In some embodiments, the conductive grounding line(s) 150, 152 can include a first conductive grounding line 150 helically wrapped clockwise around the interactive cord 140 in the longitudinal direction 154 of the interactive cord 140 and a second conductive grounding line 152 helically wrapped counter-clockwise around the interactive cord 140.

Figure 1D:
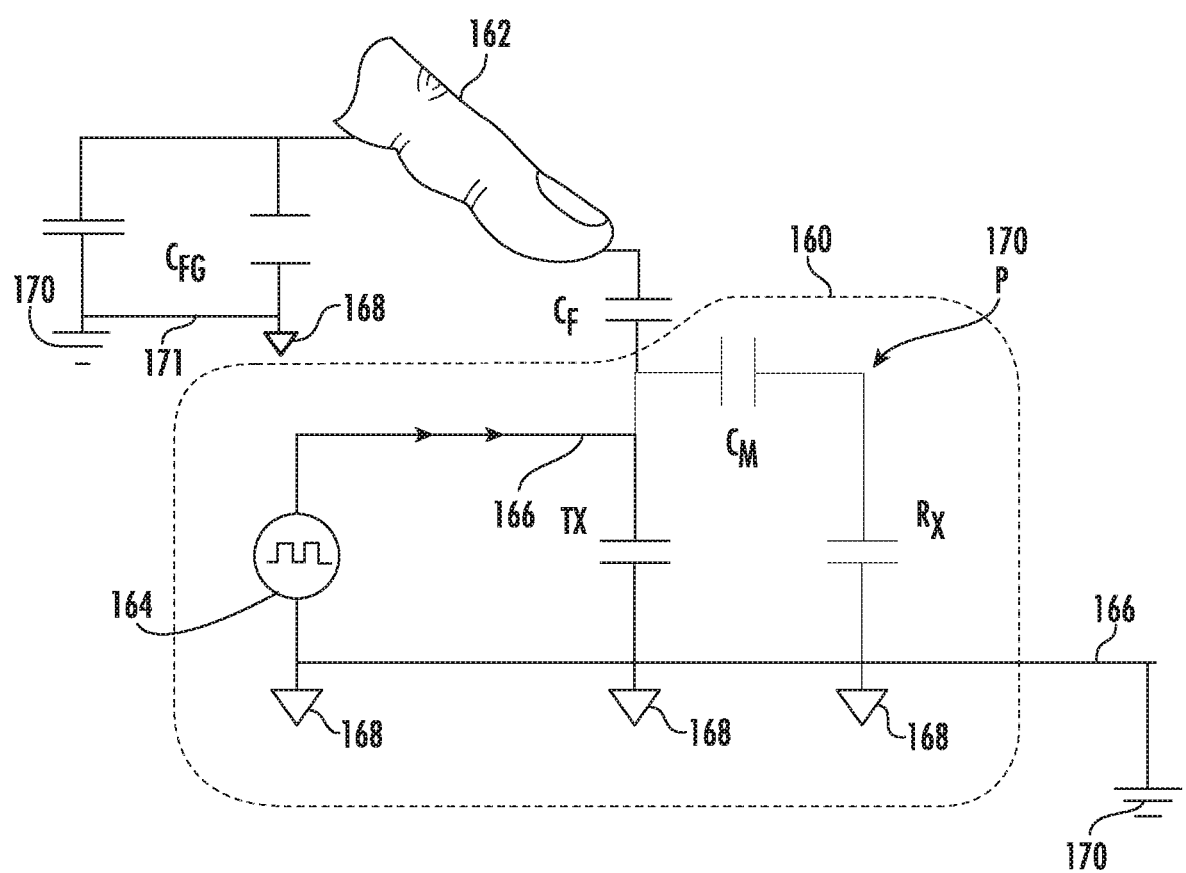
FIG. 1D is a simplified schematic of an interactive cord system and a user's finger.

FIG. 1D is a simplified schematic of an interactive cord system 160 and a user's finger 162. A signal generator 164 can be configured to apply a signal between a transmission node 166 (TX) of a conductive transmission line and a system ground 168. At a point of measurement (P) 170, a mutual capacitance (CM) between a RX node of a conductive receiving line and the TX node can be measured. For example, an amount of charge that is transferred to an RX node from a TX node through the mutual capacitance (CM) can be measured. A finger capacitance (CF) can be created between the user's finger 162 and interactive cord 160. When the finger capacitance (CF) is introduced, an alternate path to an earth ground 170 can be created for charge at the TX node of the transmission line 166. This alternate path to the earth ground 170 can reduce the change created in the mutual capacitance (CM) between the RX node and the TX node.

In some embodiments, the finger 162 can be capacitively coupled with the ground (CFG) via the conductive grounding lines (e.g., corresponding with the conductive ground lines 150, 152 of FIG. 1C). As described above with reference to FIG. 1D, the conductive grounding lines 150, 152 can be helically wrapped around the conductive cord such that the finger 162 is near the conductive grounding lines 150, 152 when the finger 162 is near the conductive transmission lines.

Additionally or alternatively, in some embodiments, the system ground 168 can be electrically connected with the user and thus the earth ground 170 (indicated by line 171). For example, a grounding object can connect the system ground 171 associated with the sensing circuitry with the user and thus the earth ground 170, for example as described below with reference to FIG. 2D. As a result, the user's finger 162 can provide a low impedance path for the TX charges to return to the system ground 168 and the earth ground 170. Thus, connection of the system ground 168 with the earth ground 170 can improve the signal generated in response to the user's finger 162 touching or being near the interactive cord.

Figure 2A:
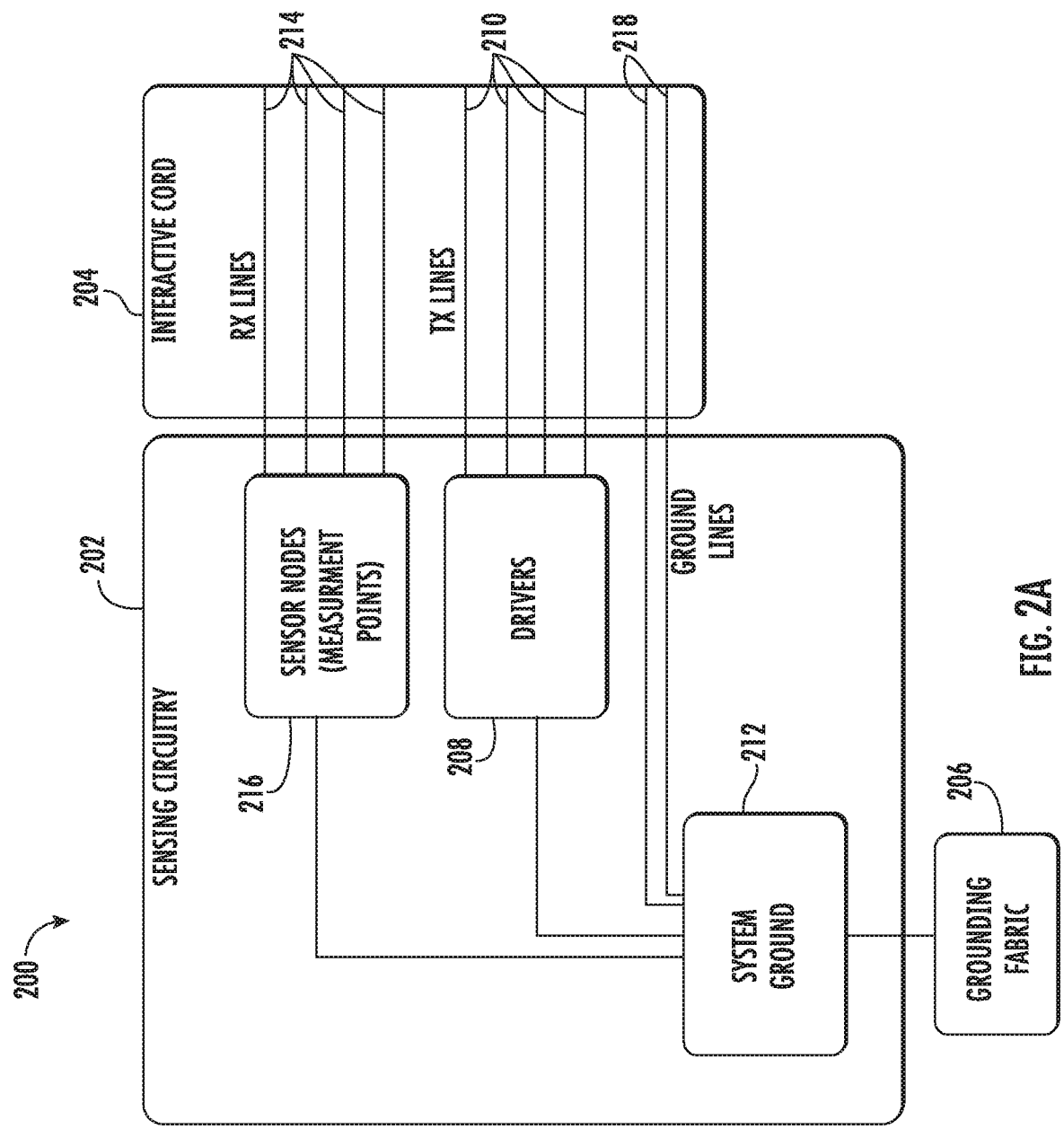
FIG. 2A is a simplified schematic of an interactive cord system according to aspects of the present disclosure.

FIG. 2A is a simplified schematic of an interactive cord system 200 according to aspects of the present disclosure. The interactive cord system 200 can include sensing circuitry 202, an interactive cord 204, and a grounding fabric 206. The sensing circuitry 202 can include one or more signal generator(s) 208. The signal generator(s) 208 can generate one or more signals in a plurality of transmission lines 210. For example, the signal generator(s) 208 can generate the signal(s) in the transmission line(s) 210 with respect to a system ground 212 coupled to the sensing circuitry 202. The interactive cord 204 can include one or more conductive receiving lines 214. The sensing circuitry 202 can include one or more sensing nodes 216 configured to detect an electrical characteristic of the conductive receiving line(s) 214.

One or more conductive ground lines 218 can be directly electrically connected with the system ground 212. The ground lines 214 can correspond with the conductive ground lines 150, 152 of FIG. 1C.

Figure 2B:
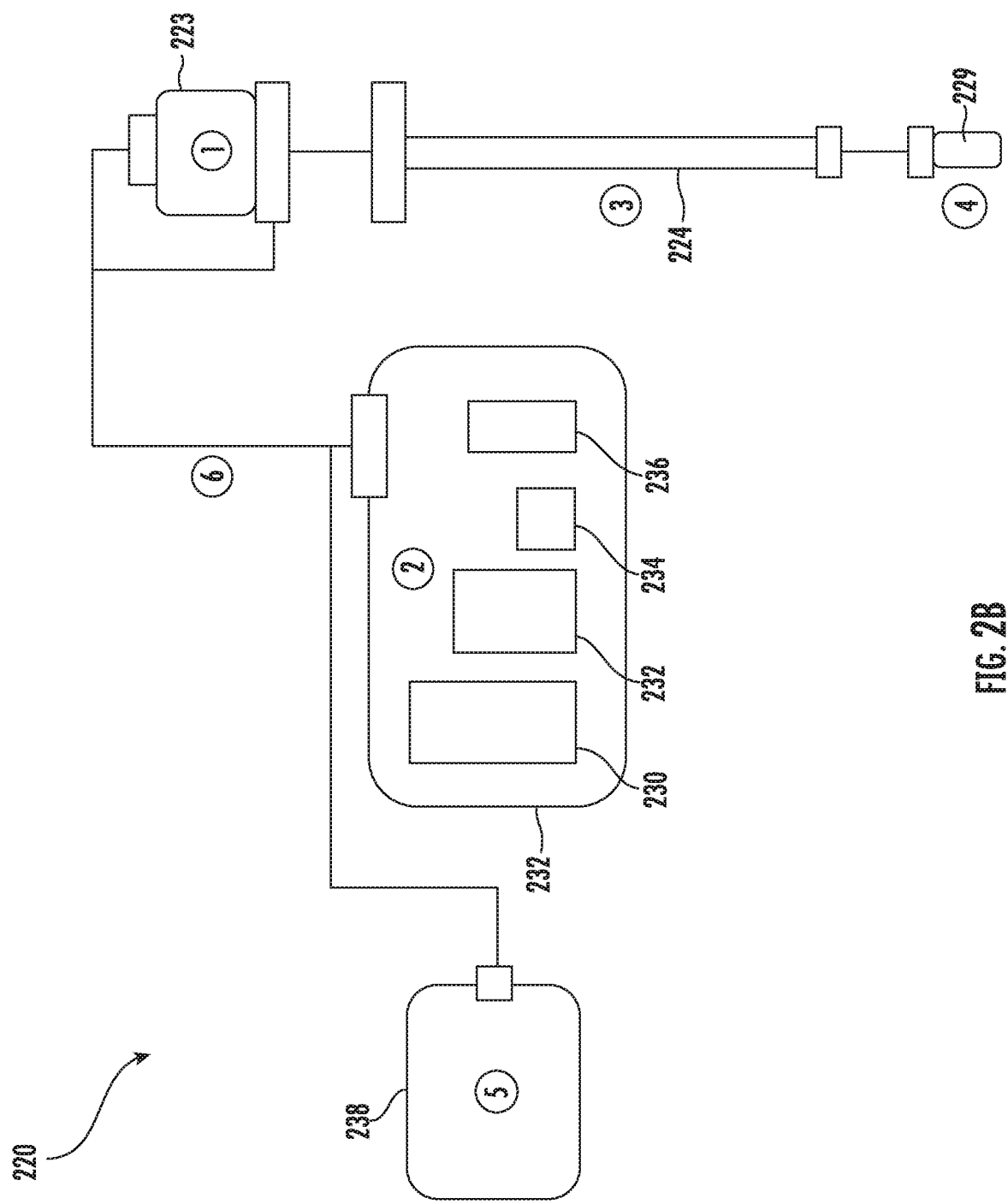
FIG. 2B is a simplified schematic illustration of a system including an interactive cord according to aspects of the present disclosure.

FIG. 2B is a simplified schematic illustration of a system 220 including an interactive cord according to aspects of the present disclosure. The system 220 can include a removable electronics module 222 electrically coupled with an interactive cord 224 via an internal electronics module 226. A grounding fabric 228 can be electrically connected with the interactive cord 224 via the internal electronics module 226 in some examples. For example, one or more of the conductive lines of the interactive cord 224 can be electrically connected with the grounding fabric 228 to ground selective ones of the conductive lines of the interactive cord 224. An aglet 229 can be electrically connected with one or more of the conductive lines of the interactive cord 224.

The removable electronics module 222 can include one or more modules, such as a communication module 230, communication radio 232, a haptic module 234, and/or a power supply 816 (such as a battery). The communication module 230 can be or include a Bluetooth module, such as Bluetooth Low Energy (BLE). The communication radio 232 can be or include a radio antenna sized and configured to receive and/or transmit Bluetooth signals. The haptic module 234 can be configured to provide haptic feedback to the user via vibration, clicking, or other movement. The power supply 236 can be or include a battery configured to provide the removable electronics module 232 with power.

The conductive lines are coupled to an internal electronics module 226 (e.g., using a connecting ribbon with can be utilized to position the conductive lines for connection to a plurality of electrical contact pads (not shown) of internal electronics module 124). The plurality of conductive lines can be collected and organized using a ribbon with a pitch that matches a corresponding pitch of connection points of an electronic component such as a component of internal electronics module 226.

Internal electronics module 226 may include sensing circuitry (not shown) in electrical communication with the plurality of conductive lines. The internal electronics module 226 may include one or more communication ports. The internal electronics module 806 can include a first communication port and a second communication port. The first communication port can be coupled to a first end portion of a communications cable. The communications cable is one example of a portion of a communication interface 162 (FIG. 3). The communication cable can include a second end portion that is coupled to a receptacle that can be configured to removably connect a second electronics module 222 to the prefabricated sensor assembly via the communication cable. The receptacle may be manufactured from a plastic, metal, polymer, or other suitable material. The receptacle can include one or more electrical contacts not shown for electrically coupling the removable electronics module to the prefabricated sensor assembly.

Figure 2C:
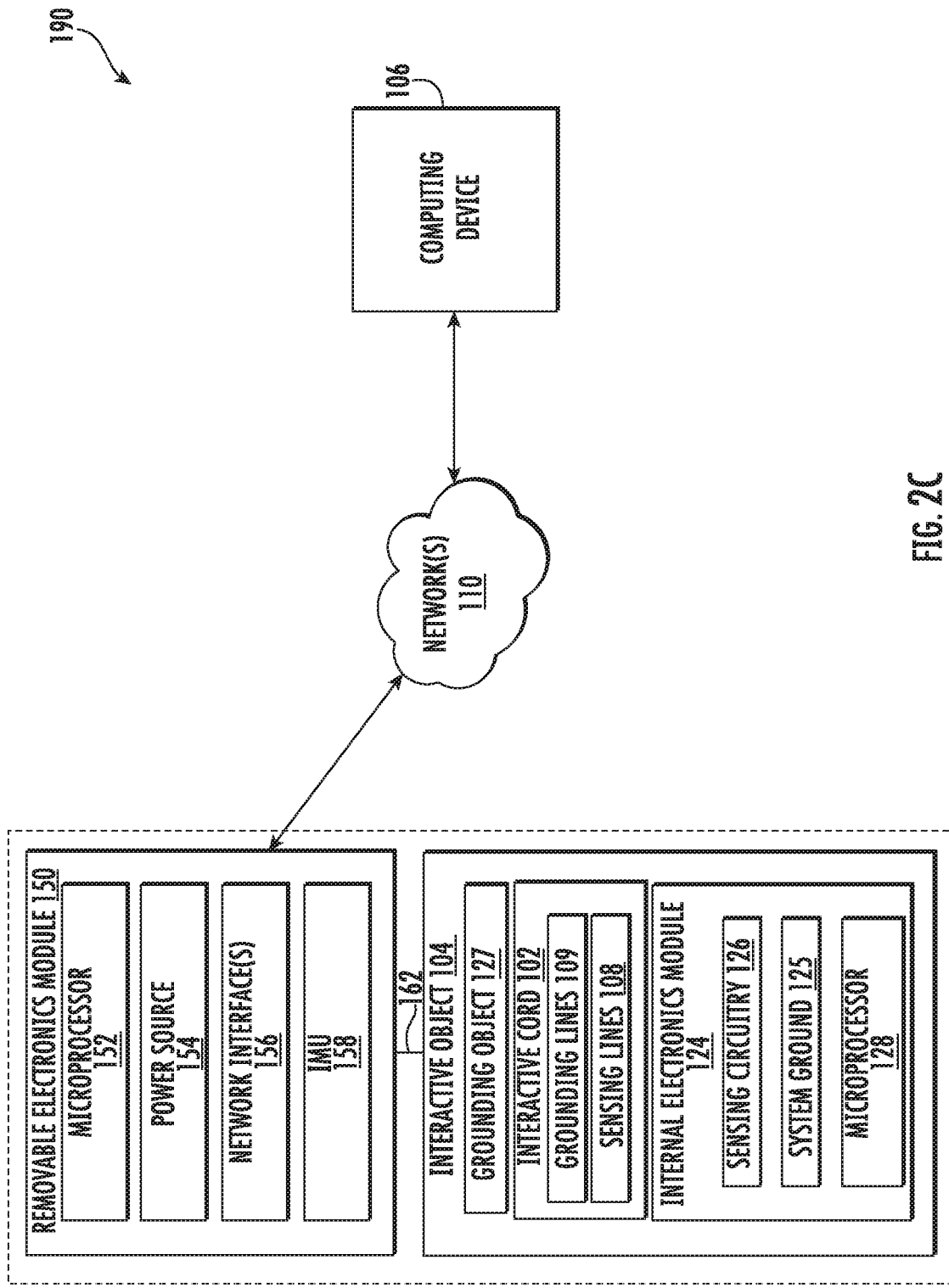
FIG. 2C which illustrates an example system that includes an interactive object, a removable electronics module, and a computing device.

FIG. 2C which illustrates an example system 190 that includes an interactive object 104, a removable electronics module 150, and a computing device 106. In the system 190, interactive cord 102 is integrated in an object 104, which may be implemented as a flexible object (e.g., shirt 104-1, hat 104-2, or handbag 104-3) or a hard object (e.g., plastic cup 104-4 or smart phone casing 104-5).

The interactive cord 102 is configured to sense touch-input from a user when one or more fingers of the user's hand touch or approach interactive cord 102. Interactive cord 102 may be configured as a capacitive touch sensor or resistive touch sensor to sense single-touch, multi-touch, and/or full-hand touch-input from a user. To enable the detection of touch-input, the interactive cord 102 can include sensing lines 108, which can be formed as a grid, array, or parallel pattern so as to detect touch input. In some implementations, the sensing lines 108 do not alter the flexibility of interactive cord 102, which enables interactive cord 102 to be easily integrated within interactive objects 104. The interactive cord 102 can include one or more grounding lines 109, for example as described herein with reference to FIGS. 1C, 2A.

The interactive object 104 includes an internal electronics module 124 that is embedded within interactive object 104 and is directly coupled to sensing lines 108. Internal electronics module 124 can be coupled to a system ground 125. The system ground 125 can be included in the internal electronics module 124 or separate from the internal electronics module 124. For example, the system ground 125 can be or include a block, foil, or the like of a conductive material, such as a conductive metal. The system ground 125 can be coupled to a grounding object 127. The grounding object 127 can be included in the interactive object 104. For example, the grounding object 127 can be coupled to an interior surface of the interactive object 104 that includes a garment. However, the grounding object 127 can be separate and/or distinct from the interactive object 104. For example, the grounding object 127 can be or include a grounding terminal in connection with earth ground (e.g., a grounding terminal of an outlet or the like).

The internal electronics module 124 can be communicatively coupled to a removable electronics module 150 via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In system 190, the electronic components contained within the internal electronics module 124 can include sensing circuitry 126, for example as described below with respect to the sensing circuitry 200 of FIG. 2A. The sensing circuitry 126 can be coupled to sensing lines 108 that form a portion of the interactive cord 102. In some examples, the internal electronics module includes a flexible printed circuit board (PCB). The printed circuit board can include a set of contact pads for attaching to the conductive lines. In some examples, the printed circuit board includes a microprocessor. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, when the conductive threads form a grid or other pattern, sensing circuitry 126 can be configured to also detect the location of the touch-input on sensing line 108, as well as motion of the touch-input. For example, when an object, such as a user's finger, touches sensing line 108, the position of the touch can be determined by sensing circuitry 126 by detecting a change in capacitance on the grid or array of sensing line 108. The touch-input may then be used to generate touch data usable to control a computing device 106. For example, the touch-input can be used to determine various gestures, such as pinch, double pinch, hold, rotate/spin, single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Internal electronics module 124 can include various types of electronics, such as sensing circuitry 126, sensors (e.g., capacitive touch sensors woven into the garment, microphones, or accelerometers), output devices (e.g., LEDs, speakers, or micro-displays), electrical circuitry, and so forth. Removable electronics module 150 can include various electronics that are configured to connect and/or interface with the electronics of internal electronics module 124. Generally, the electronics contained within removable electronics module 150 are different than those contained within internal electronics module 124, and may include electronics such as microprocessor 152, power source 154 (e.g., a battery), network interface 156 (e.g., Bluetooth or WiFi), sensors (e.g., accelerometers, heart rate monitors, pedometers, IMUs), output devices (e.g., speakers, LEDs), and so forth.

In some examples, removable electronics module 150 is implemented as a strap or tag that contains the various electronics. The strap or tag, for example, can be formed from a material such as rubber, nylon, plastic, metal, or any other type of fabric. Notably, however, removable electronics module 150 may take any type of form. For example, rather than being a strap, removable electronics module 150 could resemble a circular or square piece of material (e.g., rubber or nylon).

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

Communication interface 162 enables the transfer of power and data (e.g., the touch-input detected by sensing circuitry 126) between the internal electronics module 124 and the removable electronics module 230. In some implementations, communication interface 162 may be implemented as a connector that includes a connector plug and a connector receptacle. The connector plug may be implemented at the removable electronics module 150 and is configured to connect to the connector receptacle, which may be implemented at the interactive object 104.

In system 190, the removable electronics module 150 includes a microprocessor 152, power source 154, and network interface 156. Power source 154 may be coupled, via communication interface 162, to sensing circuitry 126 to provide power to sensing circuitry 126 to enable the detection of touch-input and may be implemented as a small battery. When touch-input is detected by sensing circuitry 126 of the internal electronics module 124, data representative of the touch-input may be communicated, via communication interface 162, to microprocessor 152 of the removable electronics module 150. Microprocessor 152 may then analyze the touch-input data to generate one or more control signals, which may then be communicated to a computing device 106 (e.g., a smart phone, server, cloud computing infrastructure, etc.) via the network interface 156 to cause the computing device to initiate a particular functionality. Generally, network interfaces 156 are configured to communicate data, such as touch data, over wired, wireless, or optical networks to computing devices. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like.

The interactive object 104 may also include one or more output devices configured to provide a haptic response, a tactical response, an audio response, a visual response, or some combination thereof. Similarly, removable electronics module 206 may include one or more output devices configured to provide a haptic response, tactical response, and audio response, a visual response, or some combination thereof. Output devices may include visual output devices, such as one or more light-emitting diodes (LEDs), audio output devices such as one or more speakers, one or more tactile output devices, and/or one or more haptic output devices. In some examples, the one or more output devices are formed as part of removable electronics module, although this is not required. In one example, an output device can include one or more LEDs configured to provide different types of output signals. For example, the one or more LEDs can be configured to generate a circular pattern of light, such as by controlling the order and/or timing of individual LED activations. Other lights and techniques may be used to generate visual patterns including circular patterns. In some examples, one or more LEDs may produce different colored light to provide different types of visual indications. Output devices may include a haptic or tactile output device that provides different types of output signals in the form of different vibrations and/or vibration patterns. In yet another example, output devices may include a haptic output device such as may tighten or loosen an interactive garment with respect to a user. For example, a clamp, clasp, cuff, pleat, pleat actuator, band (e.g., contraction band), or other device may be used to adjust the fit of a garment on a user (e.g., tighten and/or loosen). In some examples, an interactive textile may be configured to tighten a garment such as by actuating conductive threads within the interactive cord 102.

A gesture manager is capable of interacting with applications at computing devices 106 and interactive cord 102 effective to aid, in some cases, control of applications through touch-input received by interactive cord 102. For example, a gesture manager can interact with applications. A gesture manager can be implemented at removable electronics module 150, internal electronics module 124, a computing device 106 remote from the interactive object, or some combination thereof. A gesture manager may be implemented as a standalone application in some embodiments. In other embodiments, a gesture manager may be incorporated with one or more applications at a computing device.

A gesture or other predetermined motion can be determined based on touch data detected by the interactive cord 102 and/or an inertial measurement unit 158 or other sensor. For example, a gesture manager can determine a gesture based on touch data, such as single-finger touch gesture, a double-tap gesture, a two-finger touch gesture, a swipe gesture, and so forth. As another example, a gesture manager can determine a gesture based on movement data such as a velocity, acceleration, etc. as can be determined by inertial measurement unit 158.

A functionality associated with a gesture can be determined by gesture manager and/or an application at a computing device. In some examples, it is determined whether the touch data corresponds to a request to perform a particular functionality. For example, the gesture manager determines whether touch data corresponds to a user input or gesture that is mapped to a particular functionality, such as initiating a vehicle service, triggering a text message or other notification associated with a vehicle service, answering a phone call, creating a journal entry, and so forth. As described throughout, any type of user input or gesture may be used to trigger the functionality, such as swiping, tapping, or holding interactive cord 102. In one or more implementations, a gesture manager enables application developers or users to configure the types of user input or gestures that can be used to trigger various different types of functionalities. For example, a gesture manager can cause a particular functionality to be performed, such as by sending a text message or other communication, answering a phone call, creating a journal entry, increase the volume on a television, turn on lights in the user's house, open the automatic garage door of the user's house, and so forth.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 3, such as sensors, light sources (e.g., LED's), displays, speakers, and so forth.

Interactive cord 102 enables a user to control an object 104 with which the interactive cord 102 is integrated, or to control a variety of other computing devices 106 via a network 110. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a Bluetooth connection, near-field communication connection, or other local-network connection. Computing device 106 may be a remote computing device, such as a computing device of a cloud computing system.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive cord 102 can interact with computing devices 106 by transmitting touch data or other sensor data through network 110. Additionally or alternatively, interactive cord 102 may transmit gesture data, movement data, or other data derived from sensor data generated by the interactive cord 102. Computing device 106 can use the touch data to control computing device 106 or applications at computing device 106. As an example, consider that interactive cord 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on interactive cord 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by interactive cord 102.

Figure 3A:
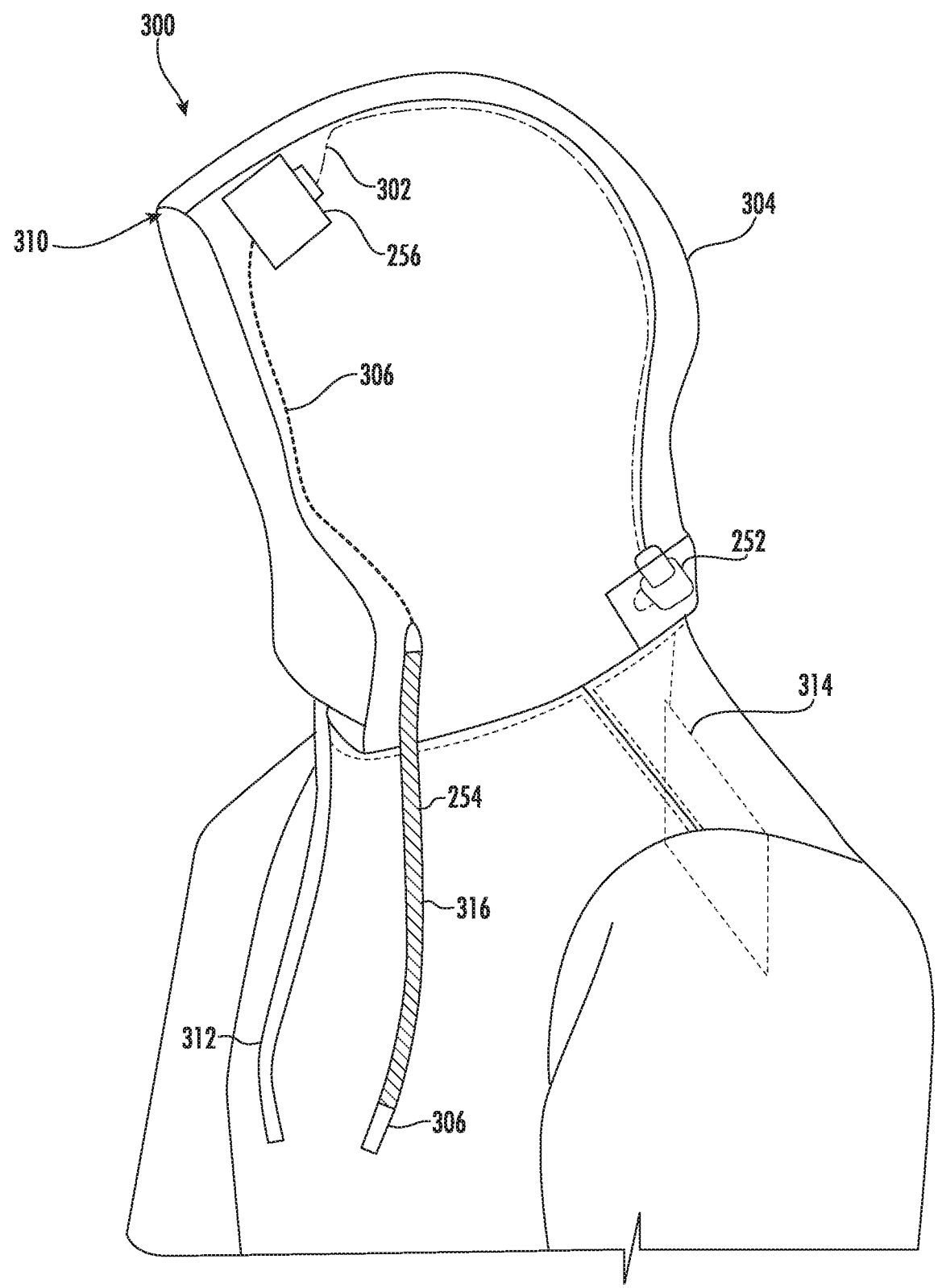
FIG. 3A illustrates a garment including components of the systems of FIGS. 2A through 2C according to aspects of the present disclosure.

FIG. 3A illustrates a garment 300, such as a hooded sweatshirt or "hoodie," that can include one or more components of the systems 190, 200, 220 of FIGS. 2A through 2C according to aspects of the present disclosure. For example, the garment 300 can include the interactive cord 224, the internal electronics module 226, and the removable electronics module 222 of FIG. 2B. The removable electronics module 222 can be electrically connected with the interactive cord 224 via the internal electronics module 226. The internal electronics module 226 can be electrically connected with the removable electronics module 222 by a cable 302. The internal electronics module 226 can be electrically connected with one or more of the conductive lines of the interactive cord 224. The interactive cord 224 can extend inside a hood 304 of the garment 300, for example, as illustrated by dotted line 306. An aglet 308 can be connected with the interactive cord 224, for example at an end of the interactive cord 224.

In some embodiments, the interactive cord 224 can terminate within the hood 304, for example at a crest 310 at a top of the hood 304. An additional cord 312 can be included opposite the interactive cord 308. In some embodiments, the additional cord 312 can be non-interactive. However, in some embodiments the additional cord 312 can be interactive and generally configured similarly to the interactive cord 224, as described herein. In yet further embodiments, a single interactive cord can extend through the hood 304 and protrude from both sides of the hood 304, for example as described with respect to and illustrated in FIG. 1B.

In some embodiments, one or more grounding objects 314 can be electrically coupled with the removable electronics module 222. The grounding object(s) 314 can be electrically connected with a system ground coupled to the removable electronics module 222 and/or internal electronics module 226. Additionally, in some embodiments, the interactive cord 224 can include one or more conductive grounding lines 316. The conductive grounding line(s) 316 can be electrically connected with the system ground and/or with the grounding object(s) 314. The grounding object(s) 314 can be configured to provide capacitive coupling with a wearer of the garment 300.

Figure 3B:
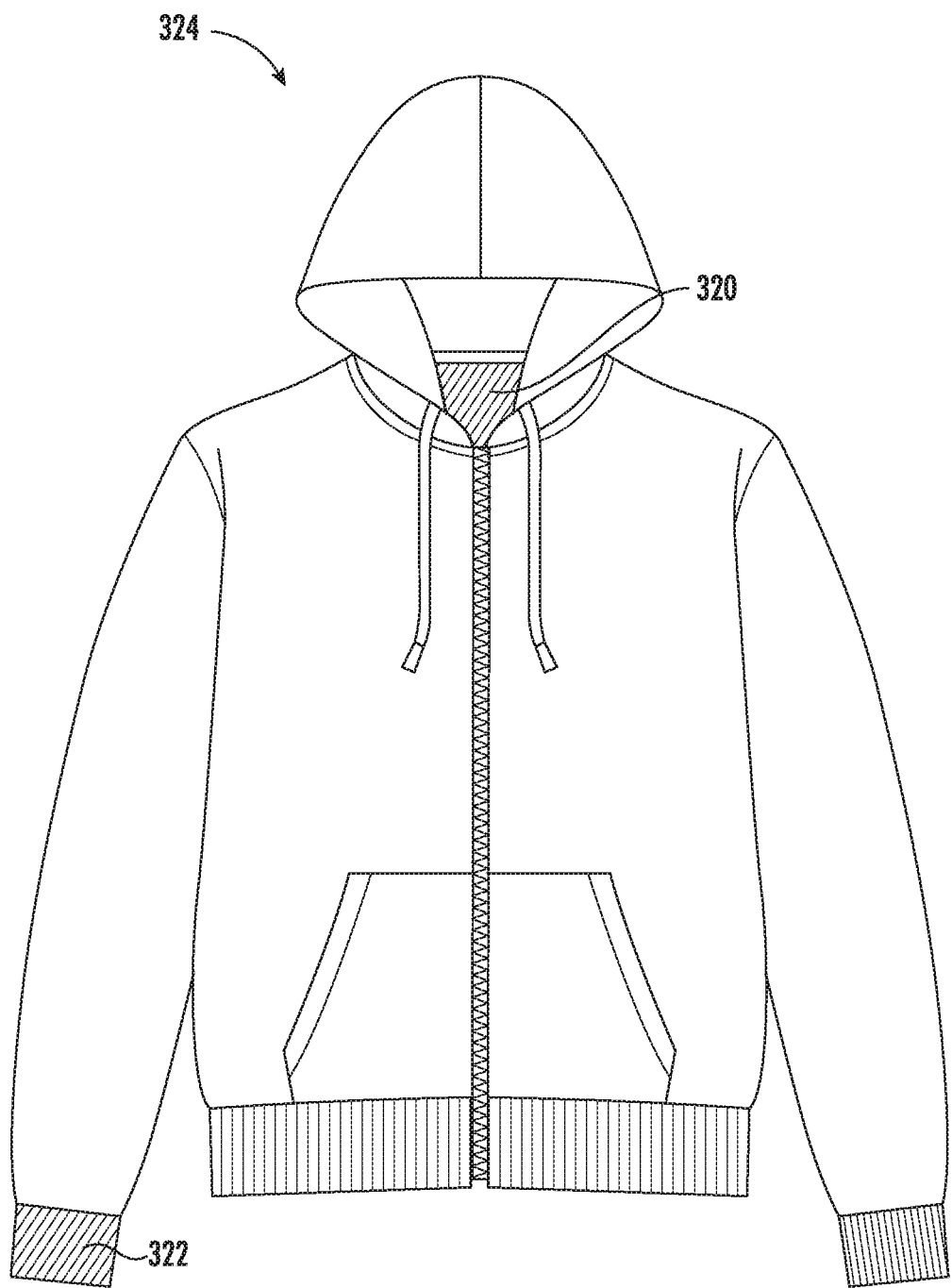
FIG. 3B illustrates example locations for grounding object(s) in a garment according to aspects of the present disclosure.

FIG. 3B illustrates example locations for the grounding object(s) 320, 322 in a garment 324. One grounding object 320 can be located on an internal surface of an upper back or neck of the garment 324. As another example, a grounding object 322 can be located on an inner surface of a sleeve of the garment 324, for example in a cuff of the garment 324. However, it should be understood that the grounding object(s) 320, 322 can be located at any suitable location on the garment 324 such that the grounding object(s) 320, 322 can provide capacitive coupling with the user.

Figure 3C:
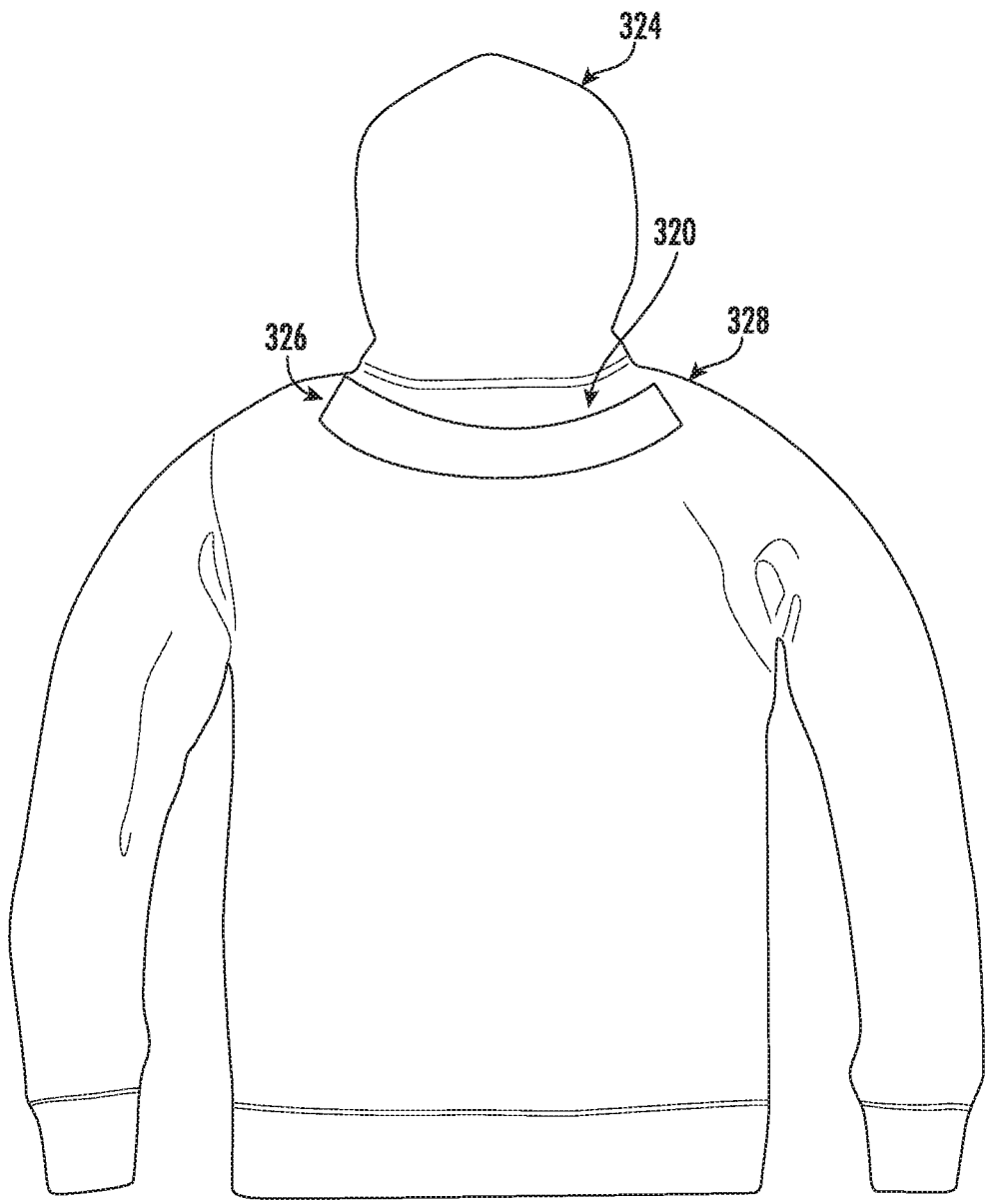
FIG. 3C illustrates an example shape of a grounding object located on an internal surface of an upper back of a garment according to aspects of the present disclosure.

FIG. 3C illustrates an example shape of the grounding object 320 located on the internal surface of the upper back or neck of the garment 324. As illustrated, the grounding object 320 can be shaped as a strip that wraps from one shoulder 326 to another shoulder 328 of the garment 324.

Figure 4:
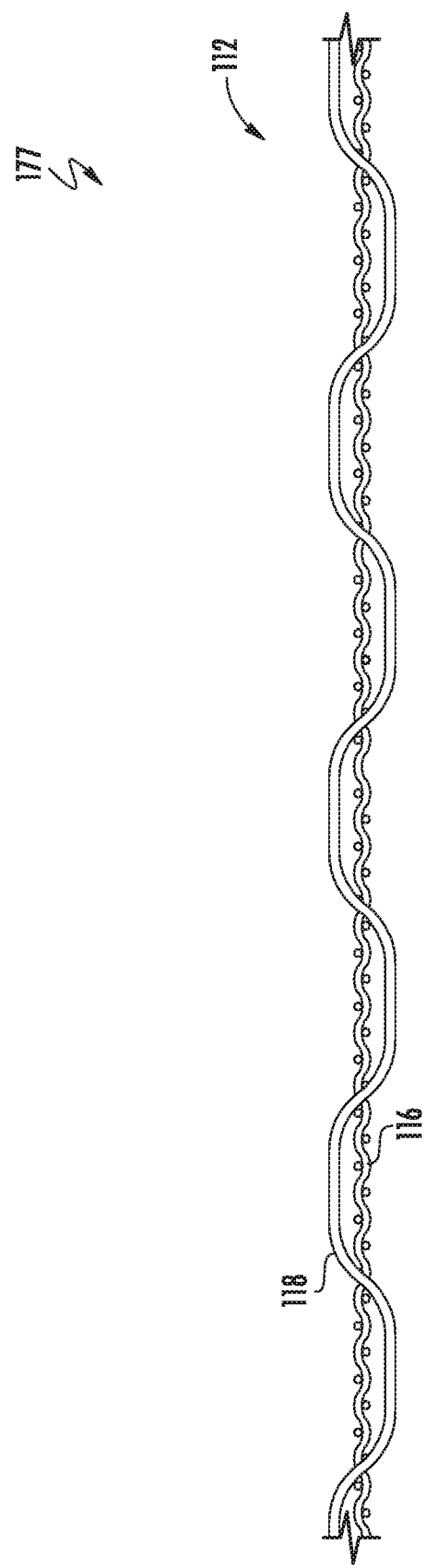
FIG. 4 illustrates an example of a conductive thread in accordance with example embodiments of the present disclosure.

FIG. 4 illustrates an example 177 of a conductive line in accordance with one or more embodiments. In example 177, conductive line 112 is a conductive thread. The conductive thread includes a conductive wire 118 that is combined with one or more flexible threads 116. Conductive wire 118 may be combined with flexible threads 116 in a variety of different ways, such as by twisting flexible threads 116 with conductive wire 118, wrapping flexible threads 116 with conductive wire 118, braiding or weaving flexible threads 116 to form a cover that covers conductive wire 118, and so forth. Conductive wire 118 may be implemented using a variety of different conductive materials, such as copper, silver, gold, aluminum, or other materials coated with a conductive polymer. Flexible thread 116 may be implemented as any type of flexible thread or fiber, such as cotton, wool, silk, nylon, polyester, and so forth.

Combining conductive wire 118 with flexible thread 116 causes conductive line 112 to be flexible and stretchy, which enables conductive line 112 to be easily woven with one or more non-conductive lines 110 (e.g., cotton, silk, or polyester) to form outer cover 104. Alternatively, in at least some implementations, outer cover 104 can be formed using only conductive lines 112.

Figure 5A:
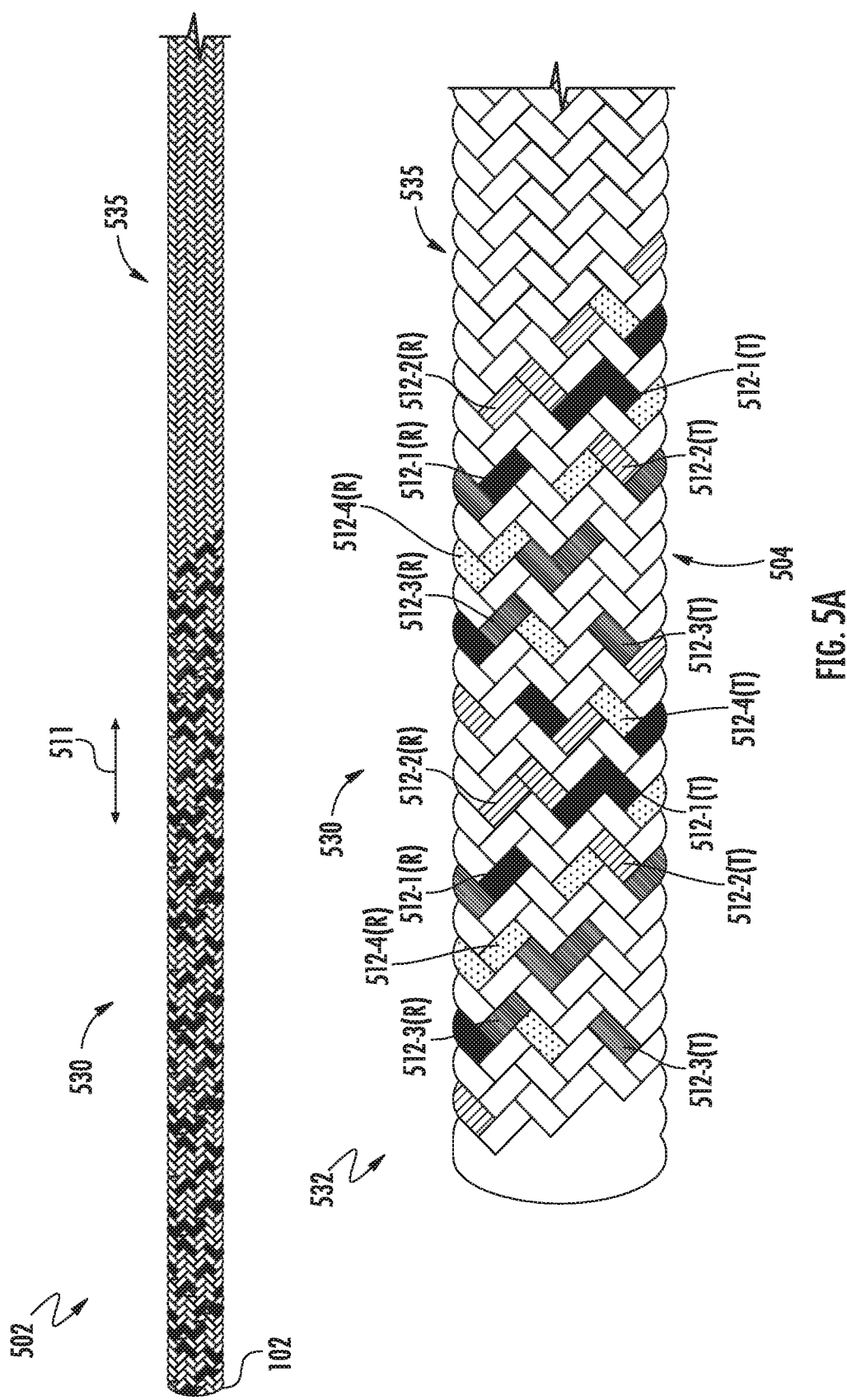
FIG. 5A illustrates an example of an interactive cord including a touch-sensitive area and a non-touch-sensitive area in accordance with example embodiments of the present disclosure.

FIG. 5A illustrates an example 502 of an interactive cord 102 in accordance with example embodiments of the present disclosure. Although not illustrated in FIG. 5A for clarity, it should be understood that the interactive cord 502 of FIG. 5A can include one or more conductive grounding lines, for example as described above with reference to FIG. 1C. In this example, the interactive cord 102 includes a touch-sensitive area 530 adjacent to a non-touch-sensitive area 535. Interactive cord 502 defines a longitudinal direction 511 along its length. Interactive cord 102 includes a plurality of conductive lines implemented as a plurality of conductive threads 512. Interactive cord 102 includes a plurality of non-conductive lines implemented as a plurality of non-conductive threads 510. Conductive threads 512 are selectively braided with the non-conductive threads 510 using two or more thread patterns to selectively define touch-sensitive area 530 for the interactive cord 102. One or more first braiding patterns may be used to form a touch-sensitive area 530 corresponding to a first longitudinal portion of the interactive cord. At the touch-sensitive area 530, conductive threads 512 are selectively exposed at the outer cover 504 of the cord to facilitate the detection of touch input a from capacitive touch points. One or more second braiding patterns can be used to form a non-touch-sensitive area 535 at a second longitudinal portion of the interactive cord 102.

The outer cover 504 may be formed by braiding conductive threads 512 with a first subset of non-conductive threads 510 at the first longitudinal portion of the interactive cord corresponding to the touch-sensitive area 530. The inner core (not shown) of the interactive cord may include a second subset of non-conductive lines at the first longitudinal portion. Optionally, the inner core may also include additional conductive lines that are not exposed at the touch-sensitive area. The second subset of non-conductive lines sensitive may or may not be braided within the inner core at the non-touch-sensitive area. At a second longitudinal portion of the interactive cord corresponding to the non-touch-sensitive area 535, the plurality of conductive threads 512 can be positioned within the inner core such that one or more of the non-conductive threads provide separation to inhibit the conductive threads from detecting touch due to capacitive coupling.

The outer cover at the second longitudinal portion can be formed by braiding the first subset of non-conductive threads and one or more additional non-conductive threads. For instance, one or more of the second subset of non-conductive threads can be routed to the outer cover at the second longitudinal portion and braided with the first subset of the non-conductive threads. In this manner, the interactive cord may include a uniform braiding appearance while using multiple braiding patterns to selectively form touch-sensitive areas. For example, the number of additional non-conductive threads braided with the first subset of non-conductive threads can be equal to the number of conductive threads such that the braiding pattern will appear to be uniform in both the touch-sensitive area 530 and non-touch-sensitive area 535. It is noted that the coloring or pattern of the individual conductive threads shown in FIG. 5A is optional. For example, the conductive threads may be formed with the same color thread as the non-conductive threads such that the interactive cord will have a uniform colored appearance across its entirety.

Within the touch-sensitive area 530, the braiding pattern of outer cover 504 exposes conductive threads 512 at capacitive touchpoints 508 along outer cover 504. Conductive threads 512 are covered and hidden from view at other areas of cover 504 due to the braiding pattern. Touch input to any of capacitive touchpoints 508 causes a change in capacitance to corresponding conductive thread(s) 512, which may be detected by sensing circuitry 182. However, touch input to other areas of outer cover 504 formed by non-conductive threads 510 does not cause a change (or a significant change) in capacitance to conductive threads 512 that is detected as an input. At the non-touch-sensitive area 535, the conductive threads can be formed within the inner core (not shown) such that touch within the non-touch-sensitive area 535 is not registered as an input.

As illustrated in the close-up view 532 of FIG. 5A, the plurality of conductive threads 512 can include threads of different types of electrodes that form capacitive sensors that use a mutual capacitance sensing technique. For example, a first group of conductive threads can form transmitter threads 512-1(T), 512-2(T), 512-3(T), and 512-4(T) and a second group of the conductive threads can form receiver threads 512-1(R), 512-2(R), 512-3(R), and 512-4(R). The transmitter threads work as the transmitters of the capacitive sensors, while the receiver threads work as the receivers of the capacitive sensors. The touch sensor can be configured as a grid having rows and columns of conductors that are exposed in the outer cover that form capacitive touch points 508. In a mutual-capacitance sensing technique, the transmitter threads are configured as driving lines, which carry current, and the receiver threads are configured as sensing lines, which detect capacitance at nodes inherently formed in the grid at each intersection.

For example, proximity of an object that is close to or at the surface of the outer cover 504 that includes capacitive touchpoints 508 may cause a change in a local electrostatic field, which reduces the mutual capacitance at that location. The capacitance change at every individual node on the grid may thus be detected to determine "where" the object is located by measuring the voltage in the other axis. For example, a touch at or near a capacitive touchpoint may decrease the distance between a pair of transmitter and receiver lines, thereby causing a detectable change in capacitance at one or more of the transmitter and receiver lines.

In the example of FIG. 5A, the outer cover 504 is formed by braiding conductive threads in opposite circumferential directions using so-called "S" threads and "Z" threads. A first group of one or more S threads can be wrapped in a first circumferential direction (e.g., clockwise) around the interactive cord and a second group of one or more Z threads can be wrapped in a second circumferential direction (e.g., counterclockwise) around the interactive cord at a longitudinal portion of the interactive cord including a touch sensor. In this particular example, a set of four S threads are utilized to form the transmitter threads 512-1(T), 512-2(T), 512-3 (T), and 512-4(T) and a set of four Z threads are utilized to form the receiver threads 512-1(R), 512-2(R), 512-3(R), and 512-4(R). The S transmitter threads 512-1(T), 512-2(T), 512-3(T), and 512-4(T) are wrapped circumferentially in the clockwise direction. The Z receiver threads 512-1(R), 512-2(R), 512-3(R), and 512-4(R) are wrapped circumferentially in the counterclockwise direction. It is noted that the transmitter threads may be wrapped circumferentially in the counterclockwise direction as Z threads and the receiver threads may be wrapped circumferentially in the clockwise direction as S threads in an alternative embodiment. Moreover, it is noted that the use of four transmitter threads and four receiver threads is provided by way of example only. Any number of conductive threads may be utilized.

The S conductive threads and Z conductive threads cross each other to form capacitive touch points 508. In some examples, the equivalent of a touchpad on the outer cover of the interactive cord 102 can be created. A mutual capacitance sensing technique can be used whereby one of the groups of S or Z threads are configured as transmitters of the capacitive sensor while the other group of S or Z threads are configured as receivers of the capacitive sensor. When a user's finger touches or is in proximity to an intersection of a pair of the Z and S threads, the location of the touch can be detected from the mutual capacitance sensor that includes the pair of transmitter and receiver conductive threads. Controller 117 can be configured to detect the location of a touch input in such examples by detecting which transmitter and/or receiver thread is touched. For example, the controller can distinguish a touch to a first transmitter conductive thread (e.g., 512-1(T)) from a touch to a second transmitter conductive thread 512-2(T), third transmitter conductive thread 512-3(T), or a fourth transmitter conductive thread 512-(T). Similarly, the controller can distinguish a touch to a first receiver thread (e.g., 512-1(R)) from a touch to a second receiver thread 512-2(R), third receiver thread 512-4(R), or a fourth receiver thread 512-4(R). In this example, sixteen distinct types of capacitive touch points can be formed based on different pairs of S and Z threads. As will be described hereinafter, a non-repetitive braiding pattern can be used to provide additional detectable inputs in some examples. For example, the braiding pattern can be changed to provide different sequences of capacitive touchpoints that can be detected by the controller 117.

Additionally and/or alternatively, a braiding pattern can be used to expose the conductive threads for attachment to device pins or contact pads for an internal electronics module or other circuitry. For example, a particular braiding pattern may be used that brings the conductive threads to the surface of the interactive cord where the conductive threads can be accessed and attached to various electronics. The conductive threads can be aligned at the surface for easy connectorization.

Figure 5B:
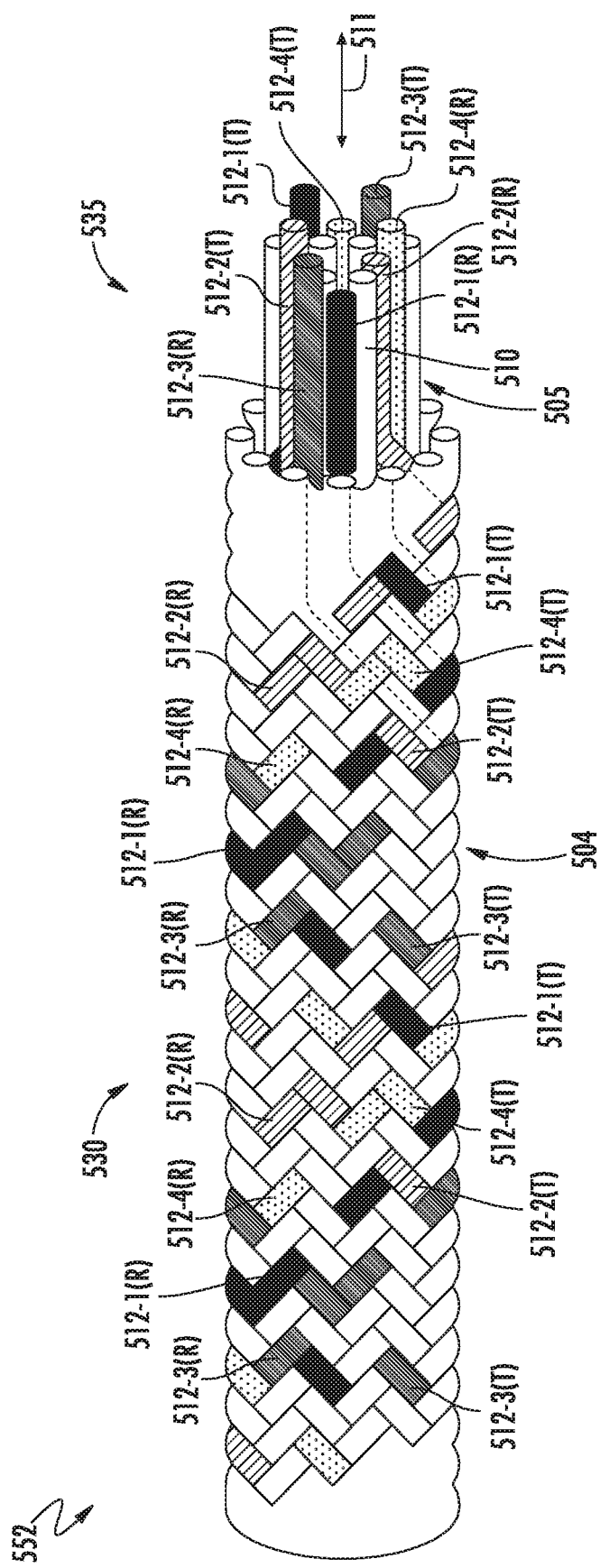
FIG. 5B illustrates an example of an interactive cord including an outer cover and an inner core in accordance with example embodiments of the present disclosure.

FIG. 5B illustrates an additional example 552 of an interactive cord 102. Although not illustrated in FIG. 5B for clarity, it should be understood that the interactive cord 552 of FIG. 5B can include one or more conductive grounding lines, for example as described above with reference to FIG. 1C. FIG. 5B depicts the outer cover 504 at the touch-sensitive area 530, and the inner core 505 at non-touch-sensitive area 535. At touch-sensitive area 530, conductive threads 512-1(T), 512-2(T), 512-3(T), 512-4(T), 512-1(R), 512-2(R), 512-3(R), and 512-4(R) are braided with a first subset of non-conductive threads 510 to form the outer cover 504 at the touch-sensitive area 530. At the touch-sensitive area 530, the conductive threads are selectively exposed on the outer cover to form capacitive touch points 508 for the capacitive touch sensor. A first braiding pattern may be used to form the outer cover at the touch-sensitive area 530 so as to expose portions of the conductive threads.

At the non-touch-sensitive area 535, the conductive threads are routed to the inner core 505 of the interactive cord 102. The inner core 505 is illustrated in a cutout view where the outer cover has been removed for illustrative purposes. As illustrated, each conductive threads 512-1(T), 512-2(T), 512-3(T), 512-4(T), 512-1(R), 512-2(R), 512-3(R), and 512-4(R) is positioned within the inner core. Additionally, some non-conductive threads are positioned within the inner core to provide separation between individual ones of the conductive threads within the inner core. Although not shown, the outer cover 504 at the non-touch-sensitive area 535 can be formed by braiding the first subset of non-conductive threads with an additional subset of non-conductive threads so a uniform braiding pattern appearance is achieved.

Various braiding processes can be used to controllably braid the conductive threads to selectively form touch-sensitive area 530 for interactive cord 102. A lace-braiding process can be used in some embodiments, such as a bobbin-lace-braiding process, also referred to as torchon-lace-braiding process. In a bobbin-lace-braiding process, a plurality of flexible lines (e.g., conductive threads and non-conductive threads) can be provided on a plurality of individually controllable bobbins. A computer-controlled process can be applied to control the bobbins and thereby braid the plurality of flexible threads using a plurality of different braiding patterns to selectively form a touch-sensitive area for a capacitive touch sensor. For instance, a first braiding pattern may be applied to form touch-sensitive area 530 by braiding one or more conductive thread 512 with one or more non-conductive threads 510 to form the outer cover 504 at a first longitudinal portion of the interactive cord for touch-sensitive area 530. A second braiding pattern may be applied to form a non-touch-sensitive area 535 by braiding only non-conductive threads 510 to form the outer cover 504 at a second longitudinal portion of the interactive cord. The second braiding pattern may position the conductive threads at the inner core 505 of the interactive cord. The conductive threads may be braided or unbraided within the inner core 505. The non-conductive threads that are braided to form the outer cover 504 at the non-touch-sensitive area provide a separation distance between the conductive threads 512 and an external touch. A uniform braiding appearance can be provided by utilizing a total number of non-conductive threads 510 and conductive threads 512 to form the outer cover at the first longitudinal portion that is equal to a total number of non-conductive threads 510 used to form the outer cover 504 at the second longitudinal portion for the non-touch-sensitive area 535.

It is noted that the braiding pattern of the conductive threads can be varied within a touch-sensitive area or for different touch-sensitive areas. Referring back to FIG. 4, the transmitter conductive threads are formed using a first repeating thread order (left to right in the longitudinal direction of the interactive cord 102): 512-4(T), 512-3(T), 512-2(T), and 512-1(T). The receiver conductive threads are formed in a second repeating thread order: 512-1(R), 512-2(R), 512-3(R), 512-4(R). Together the order of braiding the conductive threads defines a first braiding pattern.

A second braiding pattern is shown in FIG. 5A. The transmitter conductive threads are formed in a third repeating thread order: 512-1(T), 512-3(T), 512-2(T), 512-4(T). The receiver conductive threads are formed in a fourth repeating thread order: 512-1(R), 512-4(R), 512-2(R), 512-3(R). Together the order of braiding the transmitter and receiver threads defines a second braiding pattern.

Figure 5C:
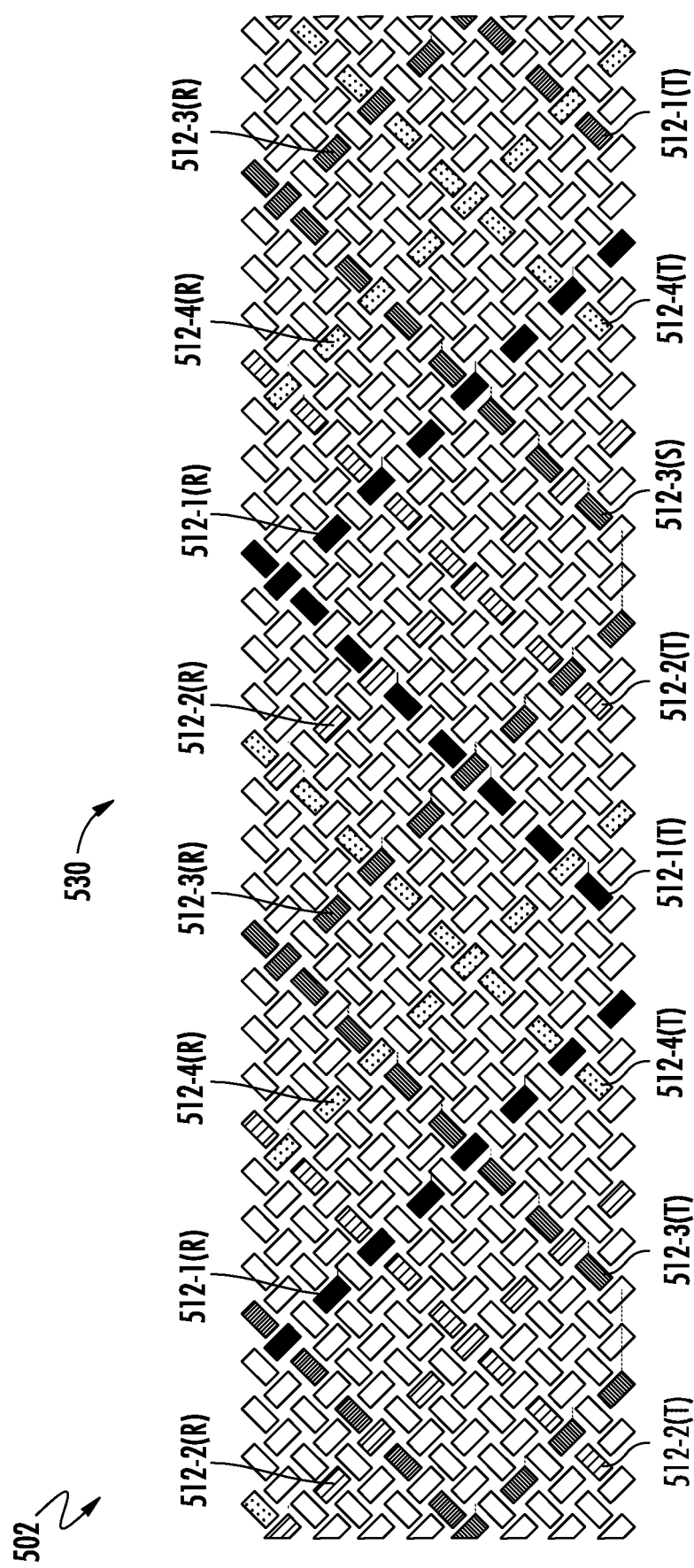
FIG. 5C illustrates an example of an interactive cord including an outer cover and an inner core in accordance with example embodiments of the present disclosure.

FIG. 5C illustrates a third example 562 of an interactive cord 102 including a touch-sensitive area 530. In example 562, interactive cord 102 includes at least one substantially flat or planar surface. Multiple braiding patterns can be used to form such an interactive cord to achieve selective touch-sensitive areas, as well as to define non-repetitive patterns for detecting touch inputs. In FIG. 5C, a third braiding pattern is illustrated. In this example, the transmitter conductive threads are formed using a fifth repeating thread pattern: 512-1(T), 512-2(T), 512-3(T), 512-4(T). The receiver conductive threads are formed using a sixth repeating thread pattern: 512-4(R), 512-3(R), 512-2(R), 512-1(R). Together the order of braiding the transmitter and receiver conductive threads defines a third braiding pattern.

Figure 6A:
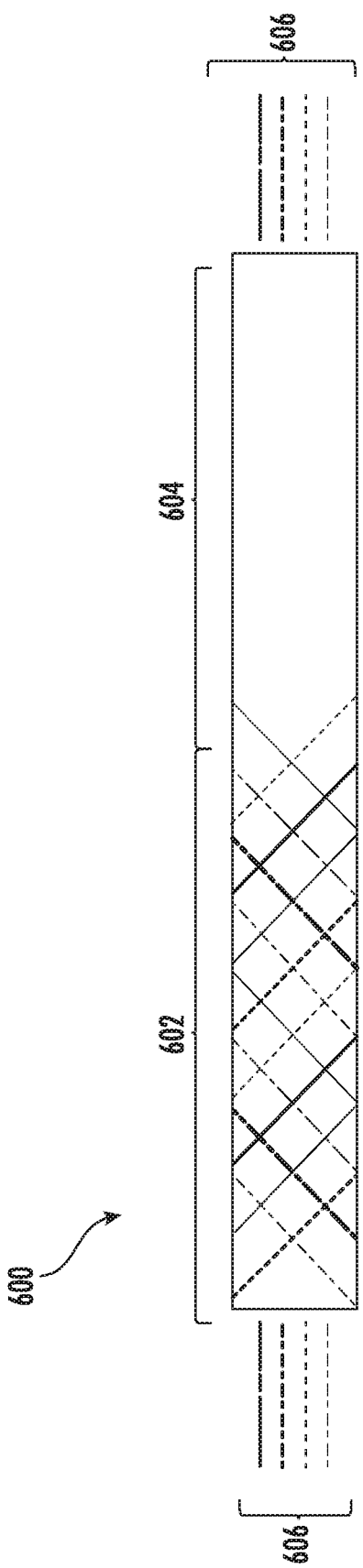
FIG. 6A is a simplified schematic illustration of a first longitudinal portion and a second longitudinal portion of an interactive cord according to aspects of the present disclosure.

FIG. 6A is a simplified schematic illustration of a first longitudinal portion 602 and a second longitudinal portion 604 of an interactive cord according to aspects of the present disclosure. A touch-sensitive area can be formed along the first longitudinal portion 602 and a non-touch-sensitive area can be formed along the second longitudinal portion 604. The interactive cord 600 can include a plurality of internal conductive lines 606 that are not exposed along an outer surface of the first longitudinal portion 602 and/or the second longitudinal portion 604. The internal conductive lines 606 can extend through the interactive cord without being exposed along the outer surface of the outer layer within the first longitudinal portion 602 and/or the second longitudinal portion 604 of the interactive cord 600.

Figure 6B:
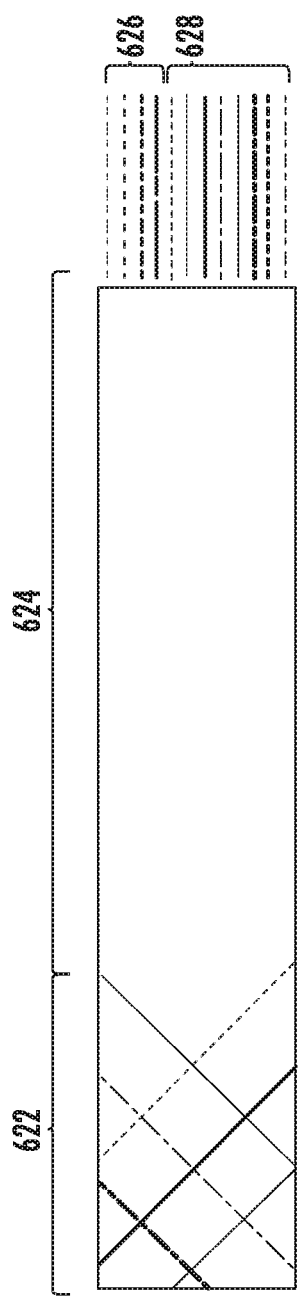
FIG. 6B is another simplified schematic illustration of a first longitudinal portion and a second longitudinal portion of an interactive cord according to aspects of the present disclosure.

FIG. 6B is another simplified schematic illustration of a first longitudinal portion 622 and a second longitudinal portion 624 of an interactive cord according to aspects of the present disclosure. A touch-sensitive area can be formed along the first longitudinal portion 622 and a non-touch-sensitive area can be formed along the second longitudinal portion 622. The interactive cord can include a plurality of internal conductive lines 626 that are not exposed along an outer surface of the first longitudinal portion 622 and/or the second longitudinal portion 624. The internal conductive lines 626 can extend through the interactive cord without being exposed along the outer surface of the outer layer within the first longitudinal portion 622 and/or the second longitudinal portion 624 of the interactive cord 600.

Figure 6D:
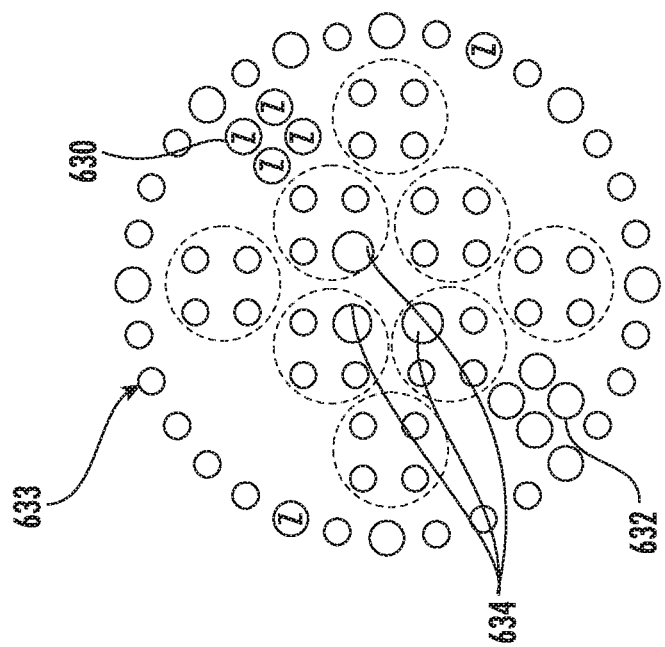
FIG. 6D is a simplified cross-sectional schematic of a second longitudinal portion of the interactive cord of FIG. 6C according to aspects of the present disclosure.
Figure 6C:
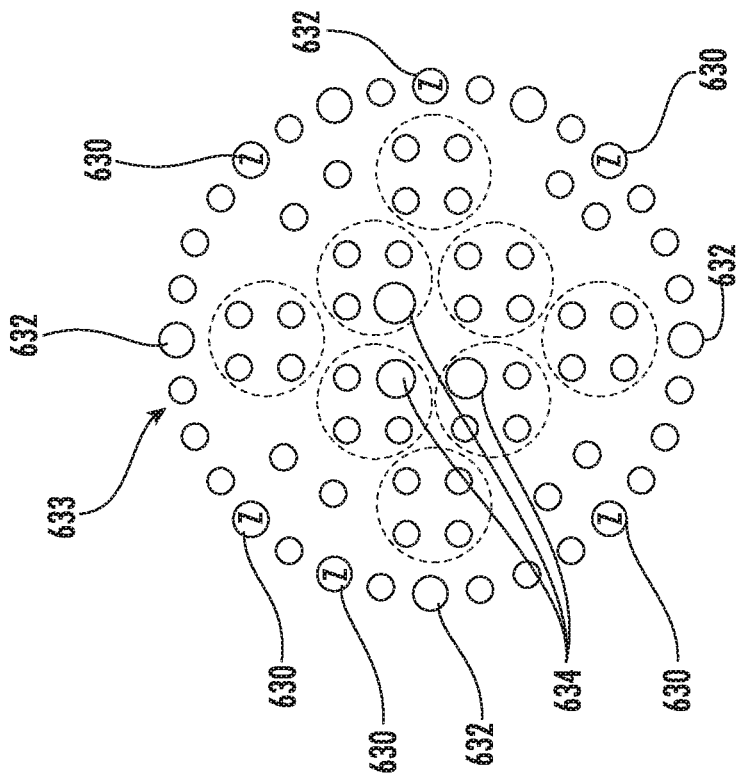
FIG. 6C is a simplified cross-sectional schematic of a first longitudinal portion of an interactive cord according to aspects of the present disclosure.

FIG. 6C is a simplified cross-sectional schematic of a first longitudinal portion of an interactive cord. The first longitudinal portion can include a touch-sensitive area. A first group of conductive lines 630 and second group of conductive lines 632 can be exposed along an outside surface of an outer layer 633 of the interactive cord in the first longitudinal portion One or more internal conductive lines 634 extend through the interactive cord without being exposed along the outer surface of the outer layer 632 of the first longitudinal portion of the interactive cord. The first group of conductive lines 630 can be woven and/or braided such that the conductive lines 630 warp around in the interactive cord in a first direction (e.g., a "Z" direction). The second group of conductive lines 632 can be woven and/or braided such that the conductive lines 632 warp around in the interactive cord in a second direction that is opposite to the first direction (e.g., an "S" direction). The first group of conductive lines 630 can each be configured as a transmission line, while the second group of conductive lines 632 can each be configured as a sensing line in a mutual capacitance sensing configuration. Conversely the first group of conductive lines 630 can each be configured as a receiving line, while the second group of conductive lines 632 can each be configured as a sensing line in the mutual capacitance sensing configuration.

FIG. 6D is a simplified cross-sectional schematic of a second longitudinal portion of an interactive cord. The second longitudinal portion can include a non-touch-sensitive area. The first group of conductive lines 630 and the second group of conductive lines 632 can be inside the outer layer 633 such that the conductive lines 630, 632 are not exposed along the outer surface of the outer layer 633 along the second longitudinal portion of the interactive cord. For example, the first group of conductive lines 630 can be grouped together with each other within the outer layer 633. The second group of conductive lines 632 can be grouped together with each other within the outer layer 633. However, it should be understood the conductive lines 630, 632 can be arranged with any suitable configuration within the outer layer 633.

FIG. 7 illustrates an interactive cord 650 including a first longitudinal portion 652. a second longitudinal portion 654, and a third longitudinal portion 656. The interactive cord 650 can include conductive grounding lines 657 extending at least along a portion of the interactive cord 650, for example as described above with reference to FIG. 1C.

The first longitudinal portion 652 can include a touch-sensitive area. The second longitudinal portion 654 can include a non-touch-sensitive area. Third longitudinal portion 656 can be open along a longitudinal direction 658 to form a pair longitudinal edges of the outer layer that extend in the longitudinal direction of the interactive cord, for example corresponding with the third longitudinal portion 412 described below with reference to FIG. 8.

FIG. 7 includes a first cross-sectional view 660 of the first longitudinal portion 652 of the interactive cord 650 and a second cross-section 662 of the second longitudinal portion 654 of the interactive cord 650. A first group of conductive lines 664 and second group of conductive lines 666 can be exposed along an outer surface of the outer layer 668 of the interactive cord along the first longitudinal portion as shown in the first cross-section view 660. A plurality of internal conductive lines 670 extend through the interactive cord along the first longitudinal portion 652 without being exposed along the outer surface of the outer layer 668 of the interactive cord.

Referring to the second cross-section 662 of the second longitudinal portion 654 of the interactive cord 650, the conductive lines 664, 666 can be located within the inner core of the interactive cord. The conductive lines 664, 666 can be spaced apart within the interactive cord 650 as compared with the respective groups of conductive lines 630, 632 of FIG. 6D. Thus, instead of the first group of conductive lines 664 being clustered together with each other, and the second group of conductive lines 666 being clustered together with each other as described above with reference to FIG. 6D, in some embodiments the conductive lines 664, 666 can be spaced apart with respect to each other. In some embodiments the first group of conductive lines 664 can be arranged in alternation with the second group of conductive lines 666 within the interactive cord 650.

As indicated above, in some embodiments, the first group of conductive lines 664 can be woven and/or braided such that the conductive lines 664 warp around in the interactive cord in a first direction (e.g., an "S" direction). The second group of conductive lines 632 can be woven and/or braided such that the conductive lines 666 warp around in the interactive cord in a second direction that is opposite to the first direction (e.g., a "Z" direction). The first group of conductive lines 630 can each be configured as a transmission line, while the second group of conductive lines 632 can each be configured as a sensing line in a mutual capacitance sensing configuration. Conversely, the first group of conductive lines 630 can each be configured as a receiving line, while the second group of conductive lines 632 can each be configured as a sensing line in the mutual capacitance sensing configuration.

FIG. 8 illustrates a cord 800 according to aspects of the present disclosure. Although not illustrated in FIG. 8 for clarity, it should be understood that the interactive cord 800 of FIG. 8 can include one or more conductive grounding lines, for example as described above with reference to FIG. 1C. The interactive cord 800 can include a plurality of conductive lines 802 woven together with one or more of a plurality of non-conductive lines 804 to form an outer layer 806. The plurality of conductive lines 802 can be woven together with the one or more of the plurality of non-conductive lines 804 along a first longitudinal portion 808 of the interactive cord 800 to form a touch-sensitive area along the first longitudinal 808 portion of the interactive cord 800. The conductive lines 802 can be arranged parallel with respect to each other along an outer surface 809 of the interactive cord 800. In some embodiments, the conductive lines 802 do not intersect each other along the outer surface 809. In some embodiments, one or more internal conductive lines can be arranged within the inner core of the interactive cord. The internal conductive lines can be not exposed along the outer surface 809 of the outer layer 806 along the first longitudinal portion 808 and/or the second longitudinal portion 810 of the interactive cord 800.

The plurality of conductive lines 802 can be arranged together with non-conductive lines 804 along a second longitudinal portion 810 of the interactive cord 800 such that the plurality of conductive lines 802 are not exposed along an outer surface 809 of the outer layer 806 to form a non-touch-sensitive area within the second longitudinal portion 810 of the interactive cord 800. For example, the conductive lines 802 can be spatially separated inwardly in a radial direction with respect to the outer surface 809 of the outer layer 806 (for example as described above with reference to the conductive lines 330, 332 of FIG. 6C and/or the conductive lines 364, 366 in the second cross-section 362 of FIG. 7). The conductive lines 364, 366 can be arranged within an inner core of the interactive cord 800. The conductive lines 802 can be located within the outer layer 806 along the second longitudinal portion 810. The conductive lines 802 may or may not be braided with each other and/or one or more of the non-conductive lines 804 along the second longitudinal portion 810. For instance, along the second longitudinal portion of 810, the plurality of conductive lines 802 can be positioned within an inner core such that one or more of the non-conductive lines 804 provide separation to inhibit the conductive lines 802 from detecting touch due to capacitive coupling (e.g., with a user's hand or finger along the outer surface 809 of the outer layer 806).

The plurality of conductive lines 802 can be woven together with the plurality of non-conductive lines 804 along at least a portion of a third longitudinal portion 812. The second longitudinal portion 810 can be arranged between the first longitudinal portion 808 and the third longitudinal portion 812 with respect to a longitudinal direction of the interactive cord 800. The third longitudinal portion 812 can be open along the longitudinal direction to form a pair of longitudinal edges 814, 816 of the outer layer that extend in the longitudinal direction of the interactive cord. As indicated above, the longitudinal direction refers to the direction of an axis running through the center of the interactive cord 800. For example, referring to FIG. 8, second longitudinal portion 810 can have a generally tubular shape. The outer layer can be opened and flattened in the third longitudinal portion 812.

Referring again to FIG. 8, the third longitudinal portion 812 can include a first section 820 in which the conductive lines 802 are woven together with the plurality of non-conductive lines 804. The third longitudinal portion 812 can include a second section 822 in which one or more of the conductive lines 802 are separated from (not woven together with) the plurality of non-conductive lines 804. The interactive cord 800 can be cut along a cutting location 824 from an individual interactive cord 826 of the conductive lines 802 woven together with the plurality of non-conductive lines 804.

Figure 12:
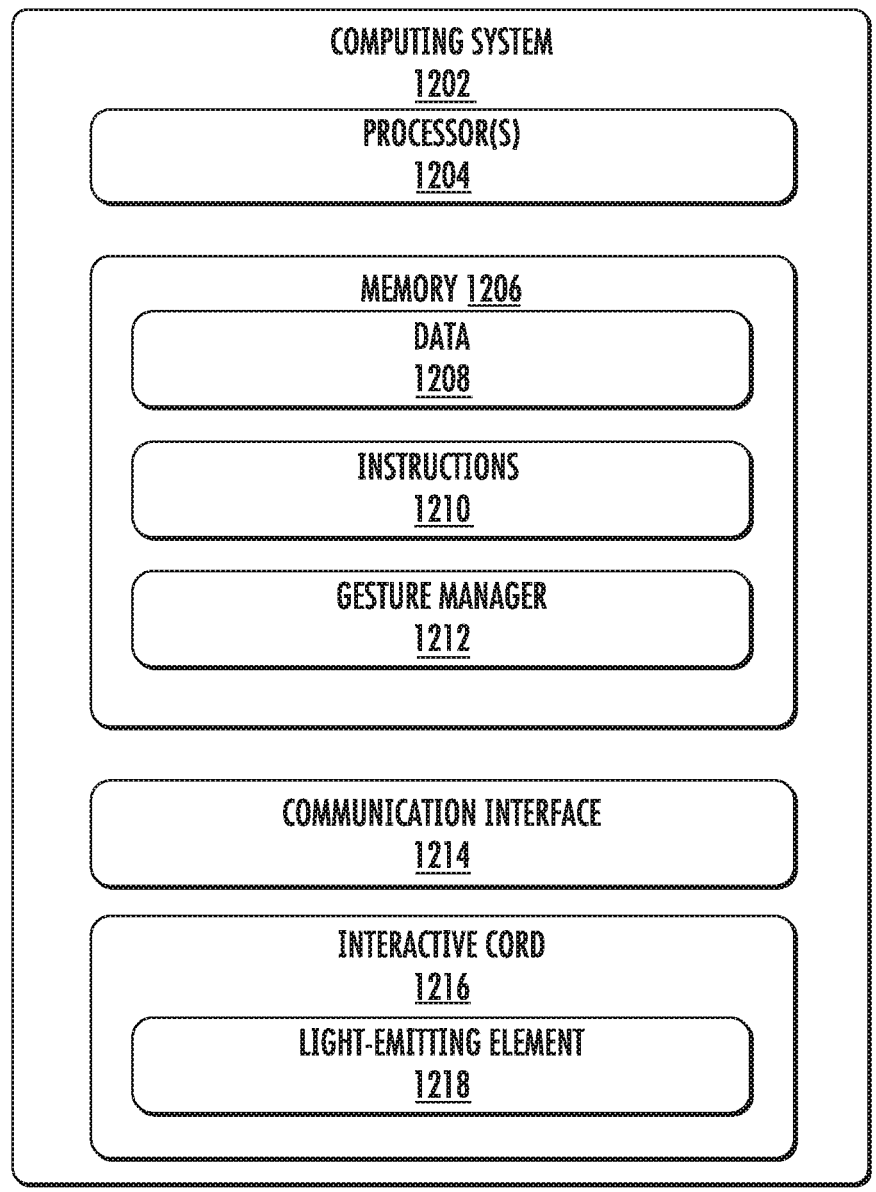
FIG. 12 illustrates a block diagram of an example computing system that can be used to implement any type of computing device as described herein.

The conductive lines 802 can be woven back into the outer layer 806 so that the conductive lines 802 can be arranged into a predetermined order for connection with an electrical connector or component (e.g., an internal electronics module 806 as described below with reference to FIG. 12). For instance, an order of the conductive lines 802 within the third longitudinal portion 812 can correspond with an order of a plurality of connection pins, terminal, or the like of the electrical connector.

Further, in some embodiments one or more internal conductive lines that are not exposed along the outer surface of the interactive cord 800 can also be woven together in the third longitudinal section. The internal conductive lines can be arranged in an order with respect to the conductive lines 802 as described above for connection with an electrical connector or component.

In some embodiments, the conductive lines 802 and one or more of the non-conductive lines 804 can be woven together in additional longitudinal sections before the interactive cord 800 is cut along the cutting location 824. For example, the conductive lines 802 and non-conductive lines 804 can be woven together to form additional longitudinal sections respectively corresponding with the first longitudinal section 808, the second longitudinal section 810, and the third longitudinal section 812 (e.g., in the same order and/or configuration). Thus, additional interactive cords can be cut from the same cord 800.

For example, a fourth longitudinal section 828 may be woven after the third longitudinal section 812. Before the cord 800 is cut at the cutting location 824 to separate the individual interactive cord 826 from the cord 800, the fourth longitudinal section 828 can be woven in a manner that corresponds with the first longitudinal section 808. A second touch-sensitive area can be formed within the fourth longitudinal portion 828 of the interactive cord. A fifth longitudinal portion of the braid can be woven such that the plurality of conductive lines is not exposed along the outer surface of the outer layer to form a second non-touch-sensitive area within the fifth longitudinal portion of the braid. A sixth longitudinal portion can be woven such that the sixth longitudinal portion is open along the longitudinal direction to form a second pair longitudinal edges of the outer layer that extend in the longitudinal direction of the braid (e.g., corresponding with the third longitudinal portion 812). The fifth longitudinal portion can be arranged between the fourth longitudinal portion and the sixth longitudinal portion with respect to the longitudinal direction of the braid such that a second individual interactive cord can be cut from the cord 826.

One or more intermediate longitudinal portions can be formed between the individual interactive cords (e.g., between the third longitudinal portion 812 and the fourth longitudinal portion 828). For example, a first intermediate longitudinal portion 830 and/or a second intermediate longitudinal portion 832 can be formed between the third longitudinal portion 812 and the fourth longitudinal portion 828. The intermediate longitudinal portions 830, 832 can be configured to rearrange and/or reorder the conductive lines 802 and/or non-conductive lines 804 as needed to start the next individual interactive cord. In the first intermediate longitudinal portion, the conductive lines 802 and/or non-conductive lines 804 can be woven together such that at least of the conductive lines 802 are exposed along the outer surface 809 of the interactive cord. In the second intermediate longitudinal portion, the conductive lines 804 can be arranged within the outer layer 806 such that the conductive lines 802 are not exposed along the outer surface 809.

In some embodiments, a second cutting location 834 can be defined within the intermediate longitudinal portions (e.g., the second intermediate longitudinal portion 822). In some embodiments, the second intermediate longitudinal portion 822 can correspond with an aglet attachment portion 836 of the interactive cord. An aglet, for example as described below with reference to FIG. 14, can be coupled to the interactive cord at the aglet attachment portion 836. In some embodiments, some or all of the conductive lines 802 and/or internal conductive lines (if present) can be woven into the outer layer 806 in the aglet attachment portion 836 and/or second intermediate longitudinal portion 822, for example to facilitate connection with the aglet. The conductive lines 802 and/or internal conductive lines (if present) can be arranged in a predetermined order to facilitate such connection (for example as described above with respect to the third longitudinal portion 812.

FIG. 9 illustrates an example individual interactive cord 840 according to aspects of the present disclosure. The interactive cord 840 can include a first longitudinal portion 842, a second longitudinal portion 844, and a third longitudinal portion 846, for example as described above with respect to FIG. 8. A plurality of conductive lines 847 can be arranged parallel with respect to each other along an outer surface 809 of the interactive cord 840, for example as described above with reference to FIG. 8. In some embodiments, the conductive lines 802 do not intersect each other along the outer surface 809. The third longitudinal portion 846 can be open along the longitudinal direction to form a pair longitudinal edges 848, 850 of the outer layer that extend in the longitudinal direction of the interactive cord 840.

In some embodiments, the configuration of the conductive lines 847 described above with respect to FIG. 8 can be included in the interactive cord 800 of FIG. 8. Conversely, the configuration of conductive lines 802 in the first longitudinal portion 808 of FIG. 8 can be included in the interactive cord 840 of FIG. 9. Furthermore, the first longitudinal portions 808, 842 described above with reference to FIG. 8 can be replaced with and/or combined with the configurations described above with reference to FIGS. 5A through 7. For instance, the first longitudinal portion 808 of FIG. 8 can instead include two groups of conductive lines that are woven in opposite directions with respect to each other (e.g., as described above with reference to FIGS. 5C through 7). Similarly, one or more internal conductive lines as described with reference to FIGS. 6A-7 can be included in the embodiments of interactive cords 800, 840 described above with reference to FIGS. 8 through 9. One or ordinary skill in the art would understand that further combinations and/or variations of embodiments described herein are within the scope of this disclosure.

Figure 10:
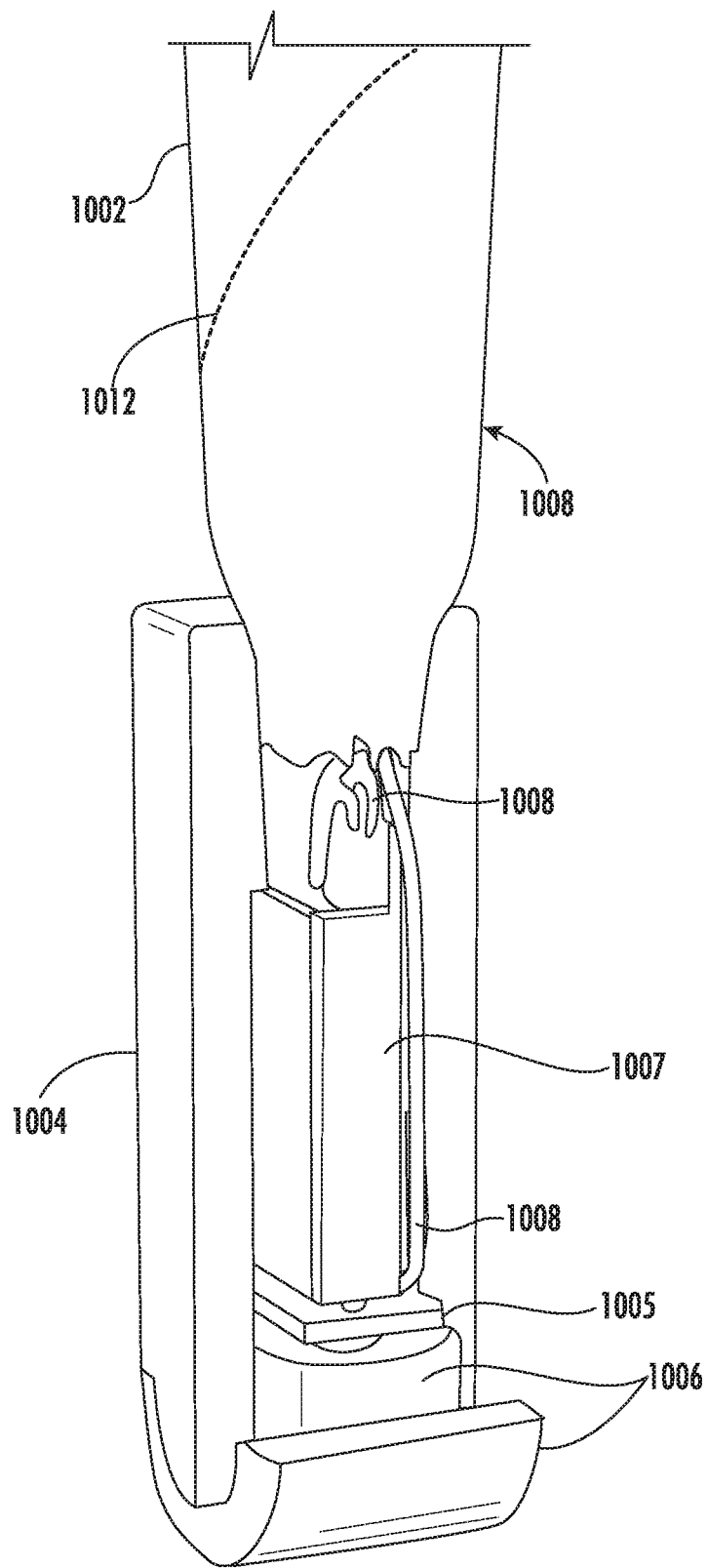
FIG. 10 illustrates an example interactive cord coupled with an aglet according to aspects of the present disclosure.
Figure 11:
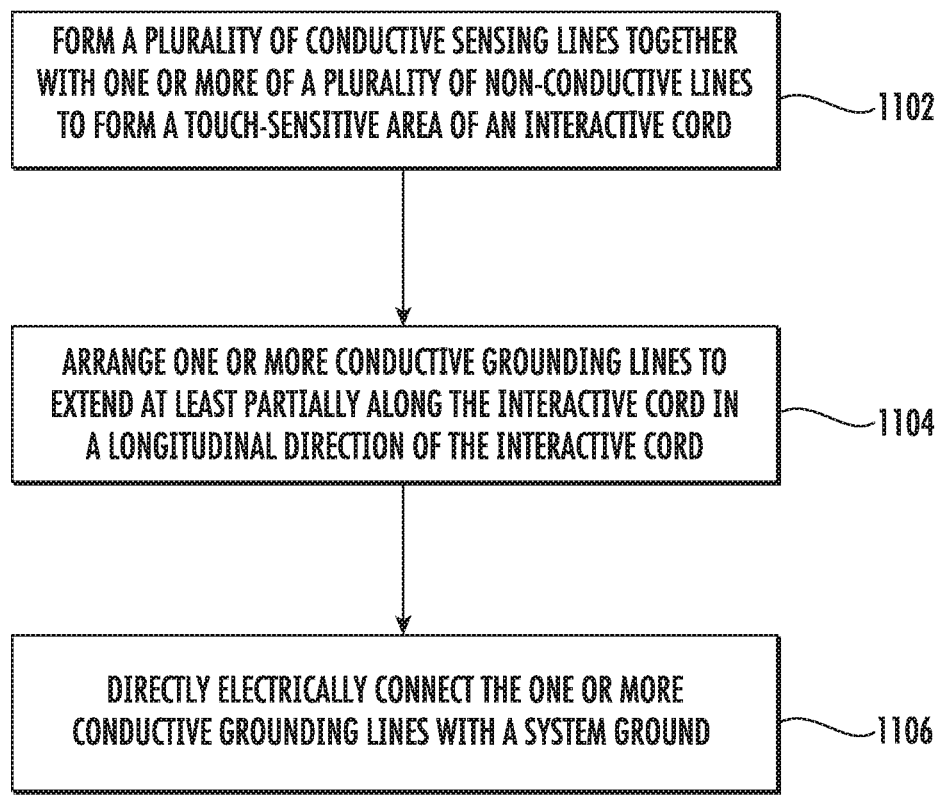
FIG. 11 illustrates a flowchart of a method of forming an interactive cord according to aspects of the present disclosure.

FIG. 10 illustrates an example interactive cord 1002 coupled with an aglet 1004 according to aspects of the present disclosure. In some embodiments, the aglet 1004 can be electrically connected with one or more of the conductive ground lines described herein. The user may touch the aglet 1004 when providing an input gesture such that the user's hand is strongly capacitively coupled and/or directly electrically connected with the system ground of the system. In such embodiments, the user may be required to touch the aglet 1004 when providing the input gesture.

In some embodiments, the aglet 1004 can include a light-emitting element 1005, such as a light-emitting diode.

The light-emitting element 1006 can be electrically connected with the interactive cord 1002. For example, in some embodiments, one or more internal conductive lines 1008 can extend through the interactive cord 1002 without being exposed along an outer surface 1010 of the interactive cord 1002 (e.g., along the first longitudinal portion 808 or the second longitudinal portion 810 of the interactive cord 800 of FIG. 8 and/or the first longitudinal portion 842 or the second longitudinal portion 844 of the interactive cord 840 of FIG. 9). In some embodiments, the interactive cord 1002 can include one or more light-emitting lines 1012. The light-emitting lines 1012 can be woven into the interactive cord 1002 like another conductive line. For instance, the light-emitting line(s) 1012 can be woven according to the first braided pattern and/or second braided pattern described above. The light-emitting element 1006 and/or light-emitting lines 1012 can be illuminated in a variety of circumstances and/or in response to one or more user inputs with respect to the interactive cord 1002. For instance, the light-emitting element 1006 and/or light-emitting lines 1012 can be illuminated to indicate and/or confirm that a user input was received with respect to the conductive lines.

In some embodiments, the aglet 1004 can include one or more sensors 1006. Example sensors include microphones, temperature sensors, humidity sensors, air pressure sensors, light sensors, electrocardiogram (EKG) sensors, inertial measurement units (IMU), touch sensors (e.g., capacitive, pressure, etc.) and pollution/air quality sensors.

In some embodiments, the aglet 1004 can include one or more haptic feedback devices 1007. The haptic feedback devices 1007 can vibrate, click, or otherwise move in a manner to provide the user with feedback (e.g., that a user gesture has been received, of a status of the interactive cord or other device, or the like).

Figure 13:
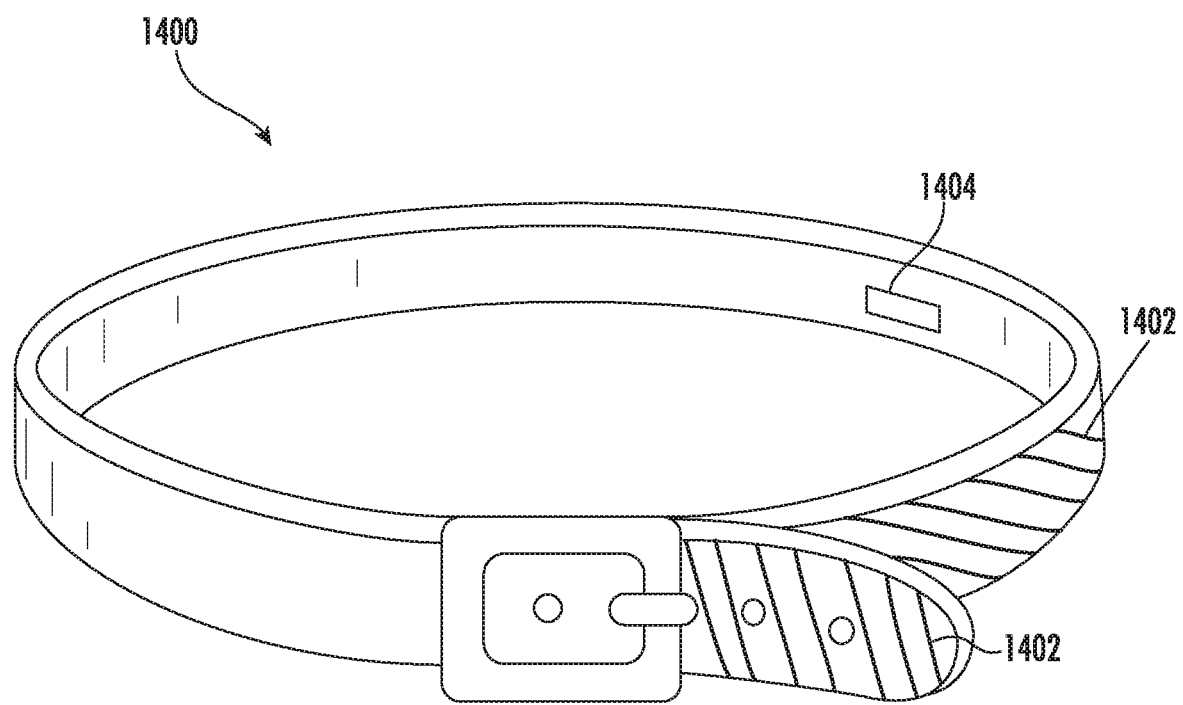
FIG. 13 illustrates an example embodiment of a belt including one or more interactive cords according to aspects of the present disclosure.

FIG. 13 illustrates an example embodiment of a belt 1400 including one or more interactive cords 1402 according to aspects of the present disclosure. The interactive cord(s) 1402 can form some or all of the belt 1400. The belt 1400 can include one or more light-emitting elements, such as light-emitting diodes and/or light-emitting conductive lines. For instance, the belt 1400 can be configured to illuminate the light-emitting elements and/or lines, to display an image, word, or the like. The computing system 1202 can start, stop, and/or adjust a pattern of illumination of the light-emitting elements in response to detecting a user input gesture with respect to the interactive cord(s) 1402. Additionally, the computing system 1202 can control one or more computing devices that are distinct from the belt 1400 (e.g., computing devices 106 of FIG. 1) in response to detecting user input(s) with respect to the interactive cord(s) 1402.

In some embodiments, the belt or other garment may produce a haptic response. For example, the garment (e.g., belt 1400), may contain a compression device, such as contractible threads or bands. For example, the compression device may expand or contract at least a portion of the garment (e.g., belt 1400) to tighten or loosen the belt. The expansion or contraction may operate responsive to a user-inputted action on a touch sensor. As other example, athletic pants and an athletic bra may be outfitted accordingly.

In some embodiments, the belt 1400 can include a grounding object 1404 may be coupled to the belt 1400 and configured to capacitively couple a wearer of the belt 1400. The grounding object 1404 can be directly electrically connected to a system ground of the system, for example as described herein. Additionally, one or more of the interactive cords 1402 can include conductive grounding lines as described herein. When the user provides an input gesture, the user may pinch or otherwise compress the interactive cords 1402, for example, if the belt 1400 includes soft and/or woven materials. Compression of the interactive cords 1402 can decrease a gap between the transmitter conductive line(s) and the receiver conductive line(s) of the interactive cords 1402 increasing mutual capacitance, as described above. The grounding object 1404 and/or grounding lines can increase the effect of the user's finger or hand on the mutual capacitance of the conductive line(s), thereby reducing a relative effect of compression on the mutual capacitance and improving signaling fidelity In some embodiments, the interactive object may produce a haptic response. For example, a user-interactive garment, may contain a compression device, such as contractible threads or bands. For example, the compression device may expand or contract at least a portion of the garment. The expansion or contraction may operate responsive to a user-inputted action on a touch sensor. For example, athletic pants and an athletic bra may be outfitted accordingly.

Figure 14:
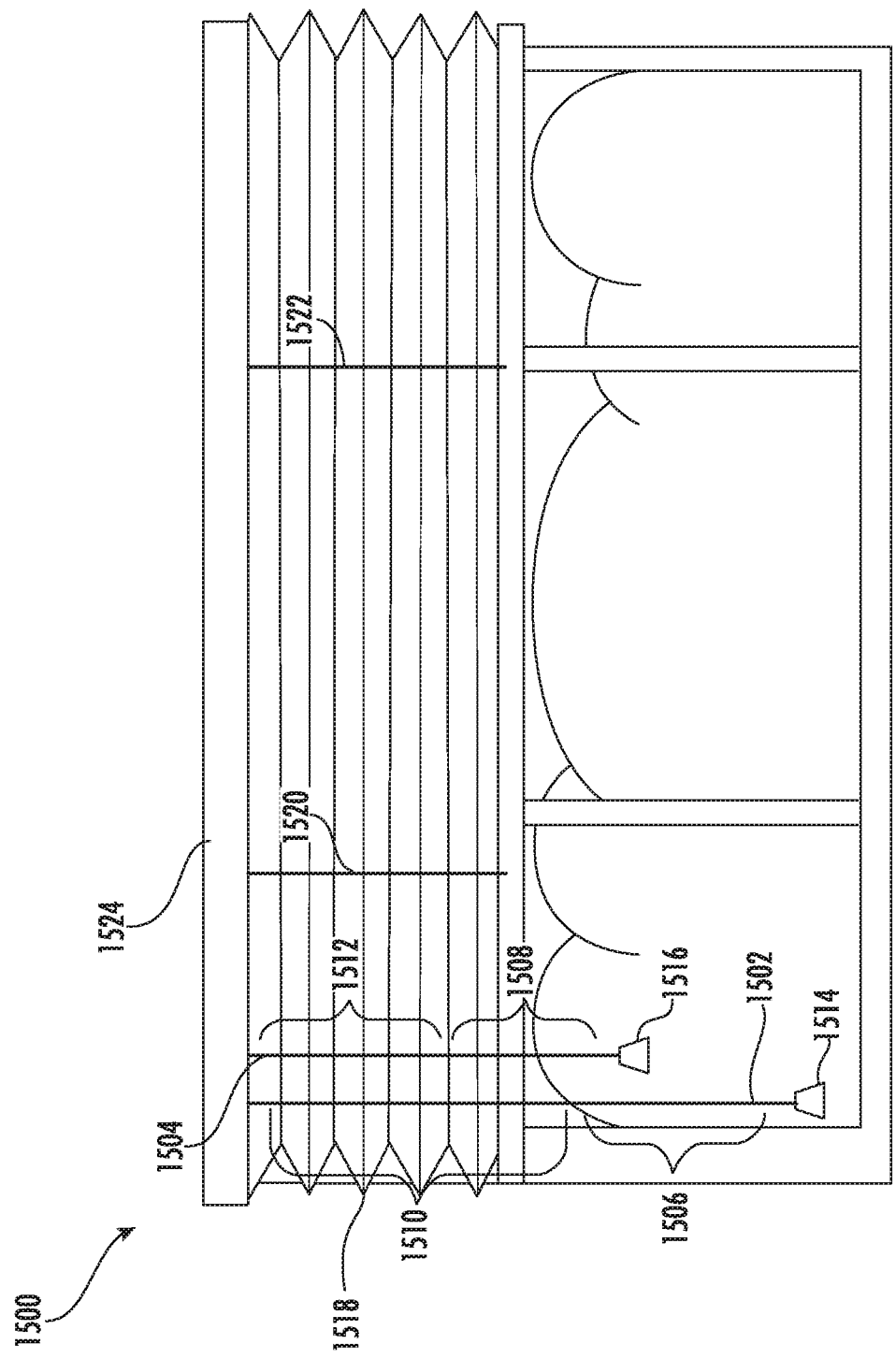
FIG. 14 illustrates an example embodiment of a window treatment including one or more interactive cord(s) according to aspects of the present disclosure.

FIG. 14 illustrates an example embodiment of a window treatment 1500, such as a window blind system, including one or more interactive cord(s) 1502, 1504 according to aspects of the present disclosure. One or more of the interactive cords 1502, 1504 can include conductive grounding lines as described herein. When the user provides an input gesture, the user may pinch or otherwise compress the interactive cords 1502, 1504. Compression of the interactive cords 1502, 1504 can decrease a gap between the transmitter conductive line(s) and the receiver conductive line(s) of the interactive cords 1502, 1504 increasing mutual capacitance, as described above. The grounding lines can increase the effect of the user's finger or hand on the mutual capacitance of the conductive line(s), thereby reducing a relative effect of compression on the mutual capacitance and improving signaling fidelity.

Additional examples of window treatments 1500 can include curtains or the like. The interactive cord(s) 1502, 1504 can include respective touch-sensitive areas 1506, 1508 and/or one or more non-touch-sensitive areas 1510, 1512. One or more of the interactive cord(s) 1502, 1504 can include an end attachment 1514, 1516. The end attachments 1514, 1516 can be configured similar to the aglets 809, 1004 described above with reference to FIGS. 9A and 10. For example, the end attachments 1514, 1516 can include respective light-emitting elements. The computing system 1202 can be configured to rotate and/or raise individual blinds 1518 of the window treatment 1500, for example by a motorized system. Additionally, the computing system 1202 can control one or more computing devices that are distinct from the window treatment 1500 (e.g., computing devices 106 of FIG. 1) in response to detecting user input(s) with respect to the interactive cord(s) 1502, 1504.

For example, the system can raise the blinds in response to a first gesture (e.g., an upward sliding of a user's hand or finger along the interactive cord(s) 1502, 1504. For instance, the system can raise the blinds to a predefined position in response to the first gesture. As additional examples, different gestures can correspond with different predefined blind positions. The first gesture can correspond with a fully opened blind position, a second gesture can correspond with a blind position that is open 25% and so forth. The system can control the raise and lower and/or tilt the blinds based on detecting the first gesture, second gesture, etc.

Further in some embodiments, the interactive cord(s) 1502, 1504 can mechanically function as normal blind cords such that pulling the cord can raise the blinds and unlatching the cord can lower the blinds, etc. In some examples, the interactive cords can be configured according to one or more safety criteria. For example, the interactive cords can be configured to break or otherwise detach from the blinds in response to certain forces and/or magnitude of forces. In this manner, the cord can avoid entanglement with users that could potentially cause harm. Moreover, the interactive cord can be configured in such a manner while remaining functional as an electrical control of the blinds and/or a mechanical control of the blinds.

In some embodiments, one or more interactive cords 1520, 1522 can be coupled to a support rail 1524 and configured to support at least one of the plurality of blinds 1518 to support the blinds 1518. One or more of the interactive cords 1502, 1504 can be coupled mechanically with one or more of the interactive cords 1520, 1522 such that a pulling action on the interactive cord(s) 1502, 1504 can move (e.g., raise, lower, tilt, etc.) the blinds 1518 via the interactive cords 1520, 1522. It should be understood that, in some embodiments, the window treatment 1500 can include a single interactive cord (e.g., corresponding to any one of the interactive cords 1502, 1504, 1520, 1522 described herein).

Figure 15:
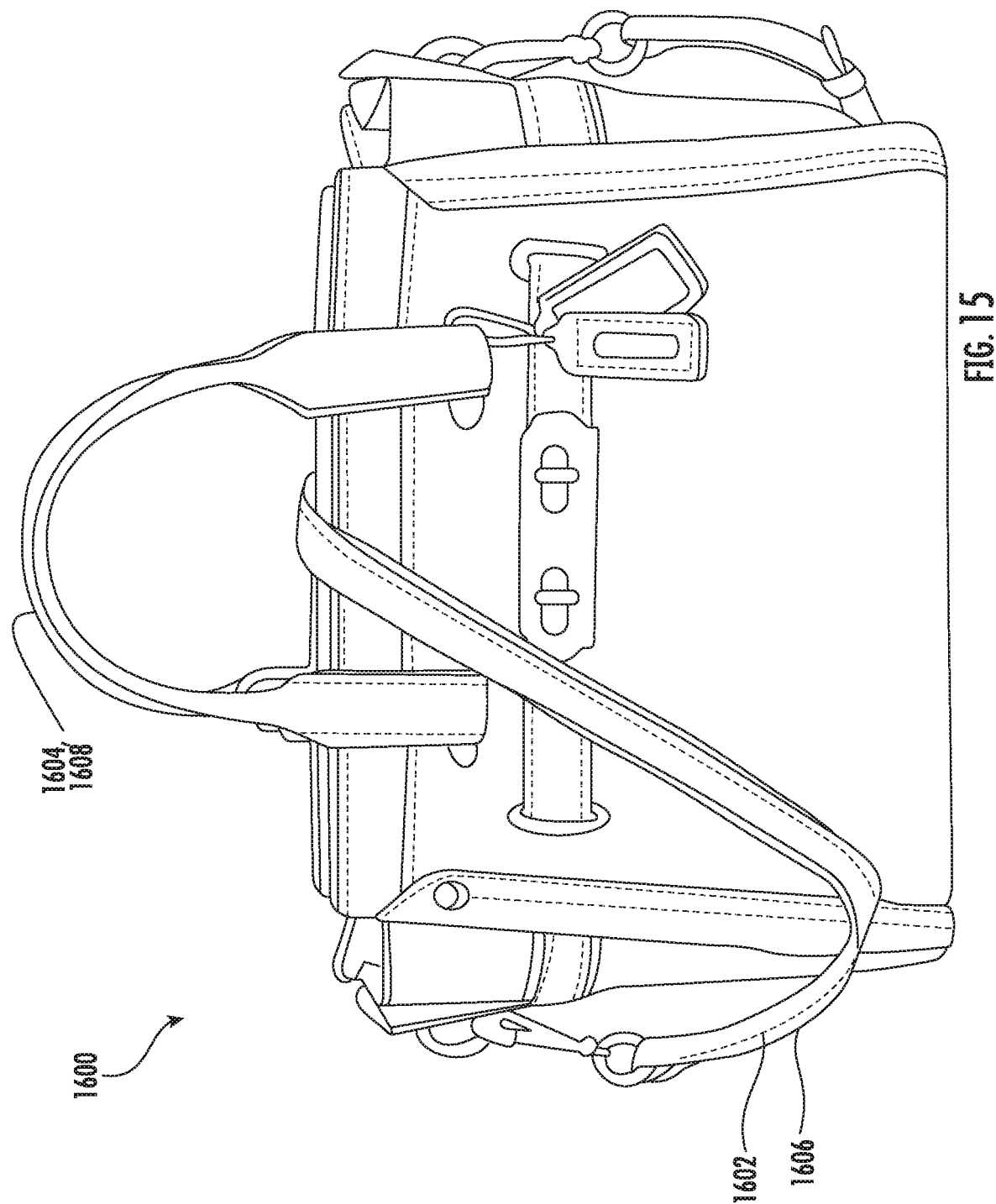
FIG. 15 illustrates an example embodiment of a bag including one or more interactive cords according to aspects of the present disclosure.

FIG. 15 illustrates an example embodiment of a bag 1600 including one or more interactive cords 1602, 1604 according to aspects of the present disclosure. The interactive cord(s) 1602, 1604 can include one or more conductive grounding lines as described above. Additionally, in some embodiments the bag 1600 can include one or more grounding objects configured to provide capacitive coupling with a wearer of the bag 1600. One or more of the interactive cord(s) 1602 can be included in a shoulder strap 1606 of the bag 1600. One or more of the interactive cord(s) 1602 can be included in a handle 1608 of the bag 1600. The computing system 1202 can be configured to control one or more features or settings of the bag 1600 in response to detecting a sliding gesture along the shoulder strap 1606 or the handle 1608. For example, the bag 1600 can include a battery for charging one or more computing devices. The computing system 1202 can be configured to adjust a charging setting and/or report a battery level, charging status, or the like in response to detecting a user input directed to the interactive cord(s) 1602, 1604. Additionally, the computing system 1202 can control one or more computing devices that are distinct from the bag 1600 (e.g., computing devices 106 of FIG. 1) in response to detecting user input(s) with respect to the interactive cord(s) 1602, 1604.

Figure 16:
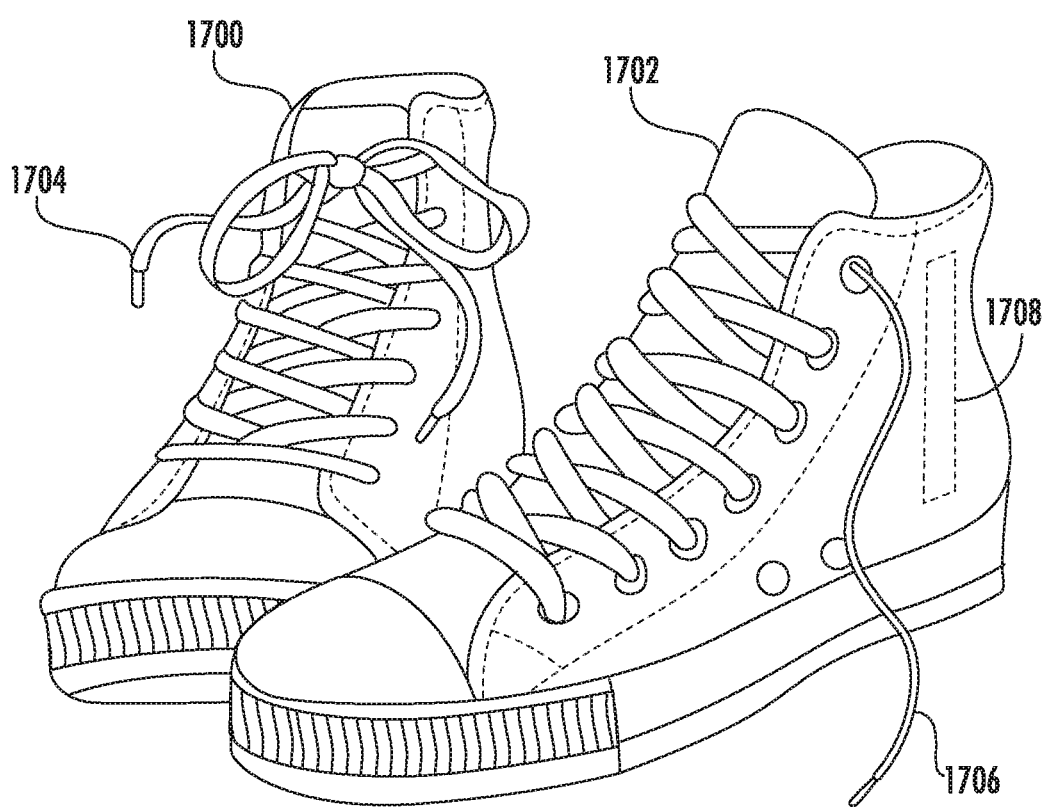
FIG. 16 illustrates an example embodiment of a pair of shoes according to aspects of the present disclosure.

When the user provides an input gesture, the user may pinch or otherwise compress the interactive cords 1602, 1604. Compression of the interactive cords 1602, 1604 can decrease a gap between the transmitter conductive line(s) and the receiver conductive line(s) of the interactive cords 1602, 1604 increasing mutual capacitance, as described above. The grounding lines and/or grounding object can increase the effect of the user's finger or hand on the mutual capacitance of the conductive line(s), thereby reducing a relative effect of compression on the mutual capacitance and improving signaling fidelity FIG. 16 illustrates an example embodiment of a pair of shoes 1700, 1702 according to aspects of the present disclosure. The shoes 1700,1702 can include respective laces 1704, 1706. One or more of the laces 1704, 1706 can respectively include one or more interactive cord(s). The interactive cord(s) can include conductive grounding lines, for example as described above. One or more of the interactive cord(s) can include respective touch-sensitive area(s) 1707 and non-touch-sensitive area(s) 1709. The computing system 1202 can be configured to control one or more features or settings of the shoes 1700, 1702 in response to detecting a user input directed to the interactive cord(s). For instance, the user can provide an input with respect to one or more of the laces 1704, 1706 to tighten the laces 1704, 1706 (e.g., by an electric motor or the like). As another example, the user can provide an input with respect to one or more of the laces 1704, 1706 to adjust an air pressure of an air cushion of the shoe(s) 1700, 1702 (e.g., by an electric air pump included in the shoe(s) 1700, 1702). Additionally, the computing system 1202 can control one or more computing devices that are distinct from the shoes 1700, 1702 (e.g., computing devices 106 of FIG. 1) in response to detecting user input(s) with respect to the interactive cord(s) of the laces 1704, 1706.

The shoes 1700 can include a grounding object 1708 configured to capacitively couple with the wearer of the shoes 1700, The grounding object 1708 can be directly electrically connected with a system ground of the system. When the user provides an input gesture, the user may pinch or otherwise compress the interactive cords 1704, 1706. Compression of the interactive cords 1704, 1706 can decrease a gap between the transmitter conductive line(s) and the receiver conductive line(s) of the interactive cords 1704, 1706 increasing mutual capacitance, as described above. The grounding lines and/or grounding object can increase the effect of the user's finger or hand on the mutual capacitance of the conductive line(s), thereby reducing a relative effect of compression on the mutual capacitance and improving signaling fidelity.

Additional examples can include a drawstring for a hooded sweatshirt that can act as interactive medium for your mobile phone; a drawstring for sweatpants that can act as a measuring device (e.g. measure waist size); a drawstring for pajama shorts or pants that can act as a sleep monitoring device.

In other examples, the interactive cord 1302 may be configured as a data transfer cord configured to transfer data (e.g., media files) between computing devices (e.g., computing device(s) 106 of FIG. 1). The interactive cord 1302 may be configured to receive touch input usable to initiate the transfer, or pause the transfer, of data between devices. The interactive cord 1302 may include any number of touch-sensitive areas and non-touch-sensitive areas.

Figure 17A:
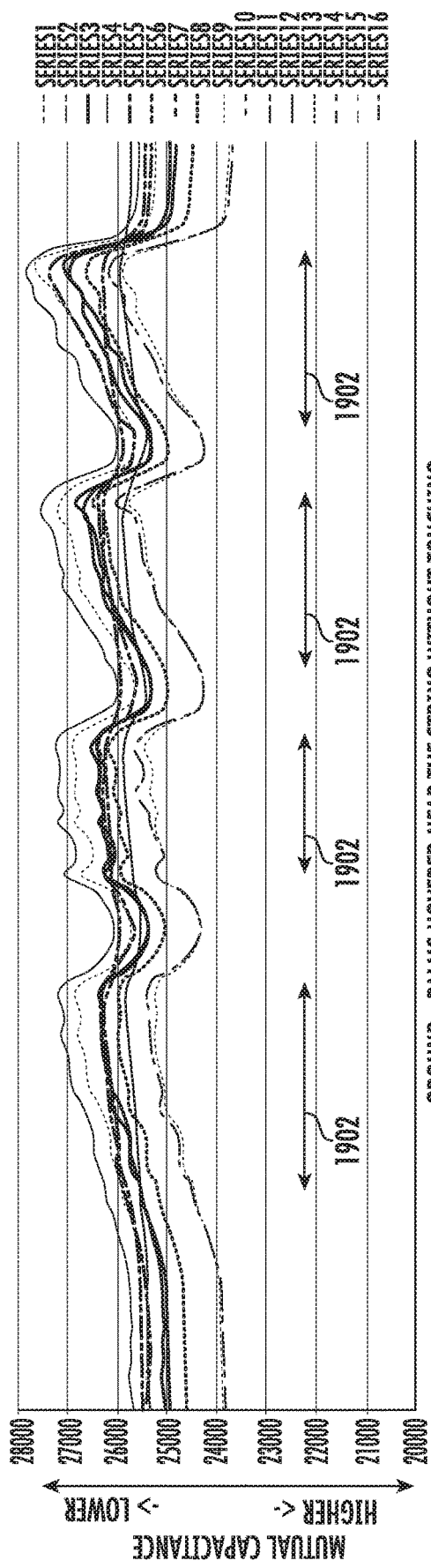
FIG. 17A illustrates experimentally detected mutual capacitance as a user's palm was repeatedly hovered near an interactive cord having a grounded configuration and then distanced from the interactive cord.
Figure 17B:
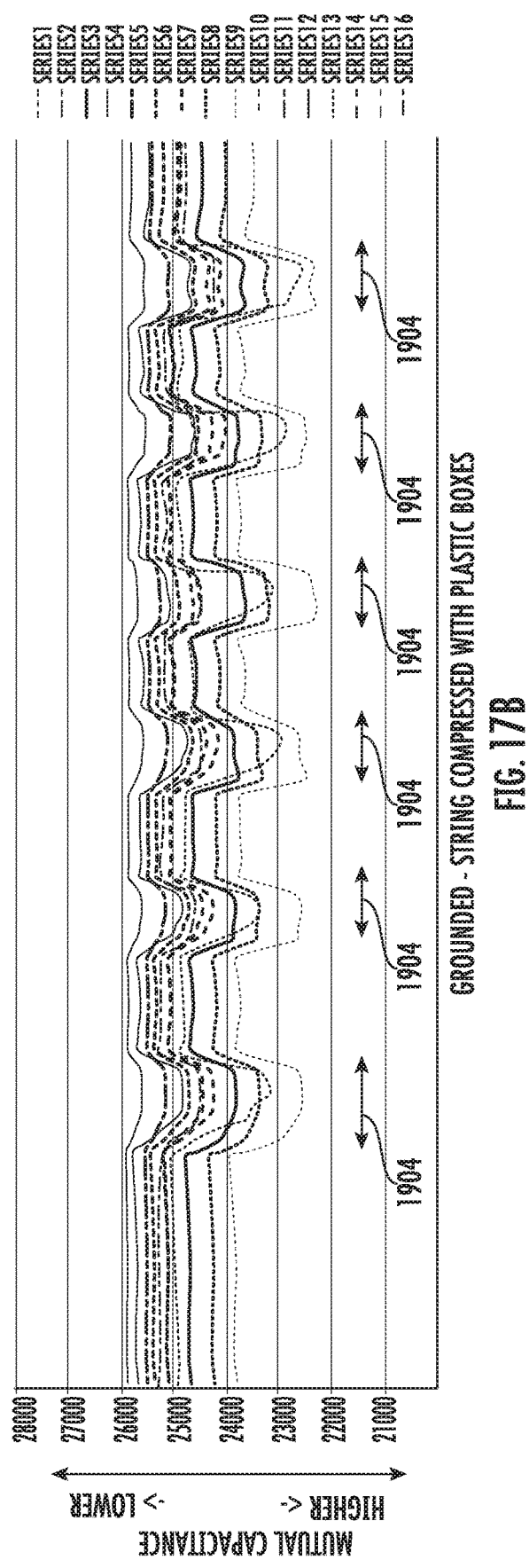
FIG. 17B illustrates detected mutual capacitance for the interactive cord as the interactive cord is compressed with a plastic object that does not create a capacitive effect between the object and interactive cord.

FIGS. 17A through 17B illustrates the effect of grounding as described herein on signals detected with an interactive cord according to aspects of the present disclosure FIGS. 17A and 17B illustrates detected mutual capacitance for an interactive cord that includes conductive grounding lines as described herein that are connected with earth ground. FIG. 17A illustrates detected mutual capacitance as a user's palm was repeatedly hovered near the interactive cord and then distanced from the interactive cord. The horizontal axis corresponds with time. The vertical axis corresponds with detected mutual capacitance where increases in mutual capacitance result in lower positions the vertical axis. As can be seen in FIG. 17A, when the user's palm is near the interactive cord, mutual capacitance is lowered (illustrated by a higher position in the vertical direction) in time regions 1902.

FIG. 17B illustrates detected mutual capacitance for the interactive cord as the interactive cord is compressed with a plastic object that does not create a capacitive effect between the object and interactive cord. As illustrated in FIG. 17B, compression of the interactive cord increases mutual capacitance (illustrated by a lower position in the vertical direction) as shown by arrows 1904.

Figure 18A:
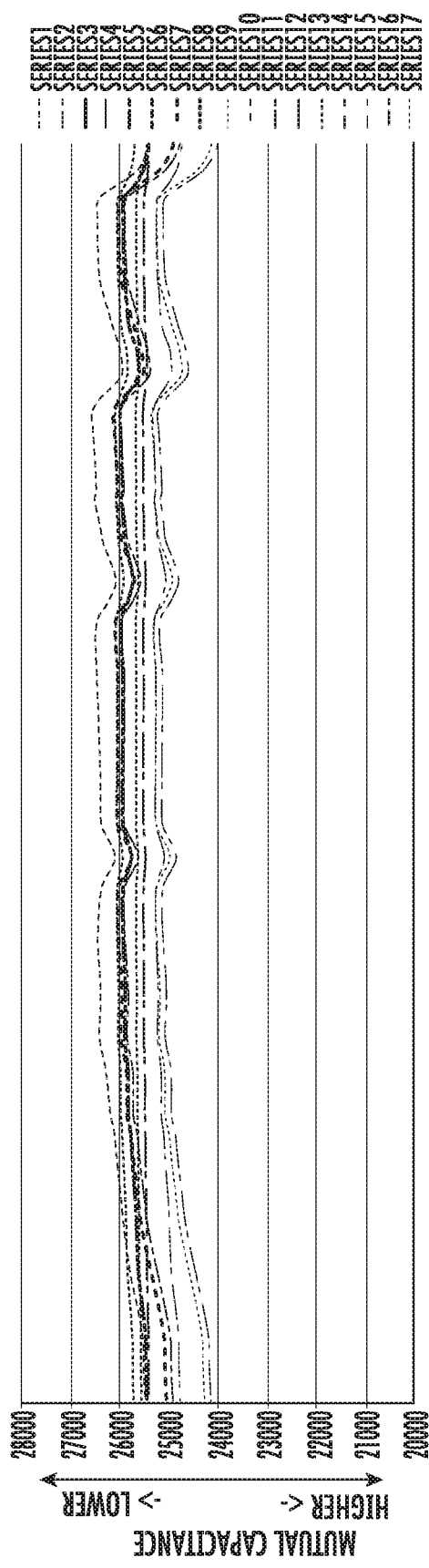
FIG. 18A illustrates experimentally detected mutual capacitance as a user's palm was repeatedly hovered near an interactive cord that does not have a grounded configuration and then distanced from the interactive cord.
Figure 18B:
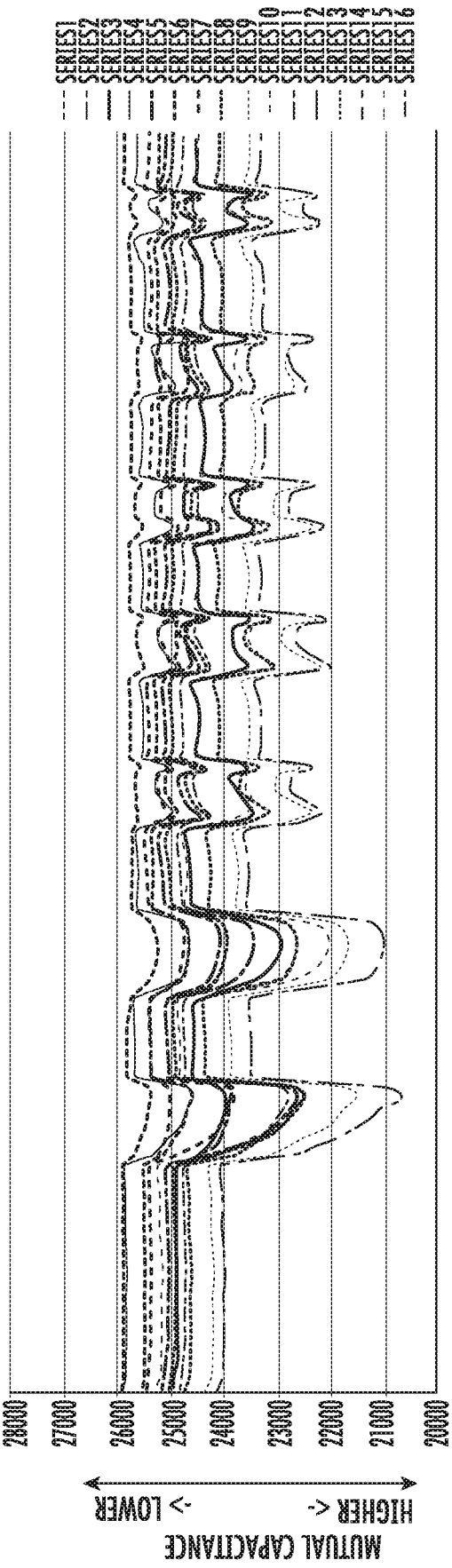
FIG. 18B illustrates detected mutual capacitance for the interactive cord as the interactive cord that does not have a grounded configuration is compressed with a plastic object that does not create a capacitive effect between the object and interactive cord.

In contrast, FIGS. 18A and 18B illustrate the same respective experiments, in which the interactive cord did not include conductive grounding lines. As illustrated in FIG. 18A, the effect was reduced of the user's palms hovering near the interactive cord without touching the interactive cord. In this experiment, the effect of compression of the interactive cord would dominate when a user pinches the interactive cable, combining the effects illustrated in FIGS. 18A and 18B, respectively. Thus, connecting the conductive grounding lines with earth ground as described herein was shown to provide better detectability of a user gesture based on presence of the user's hand near the conductive line without requiring compression of the interactive cord to detect the gesture.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive cord system, comprising:
   sensing circuitry coupled to a system ground; and
   an interactive cord, comprising:
   a plurality of non-conductive lines;
   a plurality of conductive sensing lines at least partially woven with one or more of the plurality of non-conductive lines to form at least one touch-sensitive area along the interactive cord; and
   one or more conductive grounding lines electrically connected with the system ground and extending at least partially along an outer portion of the interactive cord.

2. The interactive cord system of claim 1, wherein the system ground comprises a floating ground.

3. The interactive cord system of claim 1, wherein the system ground comprises a metal body.

4. The interactive cord system of claim 1, wherein the system ground is configured to capacitively couple with a user of the interactive cord system.

5. The interactive cord system of claim 1, wherein the one or more conductive grounding lines is helically wrapped around at least one of the plurality of the non-conductive lines or at least one of the plurality of the conductive sensing lines.

6. The interactive cord system of claim 1, wherein the one or more conductive grounding lines comprises a first conductive grounding line helically wrapped clockwise around the interactive cord in a longitudinal direction of the interactive cord, and wherein the one or more conductive grounding lines comprises a second conductive grounding line helically wrapped counter-clockwise around the interactive cord.

7. The interactive cord system of claim 1, further comprising a grounding object configured to provide capacitive coupling with a user of the interactive cord system, and wherein the system ground is directly electrically connected with the grounding object.

8. The interactive cord system of claim 7, wherein the grounding object comprises a grounding fabric comprising a plurality of conductive fibers woven together with each other.

9. The interactive cord system of claim 1, further comprising a garment and a grounding object coupled to the garment such that the grounding object is configured to provide capacitive coupling with a wearer of the garment to ground the grounding object, and wherein the system ground is connected with the grounding fabric.

10. The interactive cord system of claim 1, further comprising a garment and a grounding object coupled to the garment along an internal surface of the garment, and wherein the system ground is connected with the grounding object.

11. The interactive cord system of claim 1, wherein the sensing circuitry is configured to detect a change in mutual capacitance with respect to at least one of the plurality of sensing conductive lines.

12. The interactive cord system of claim 1, wherein the plurality of conductive sensing lines comprise a plurality of transmitter lines and a plurality of receiver lines, and wherein the sensing circuitry is configured to detect a change in mutual capacitance between at least one transmitter line of the plurality of transmitter lines and at least one receiver line of the plurality of receiver lines.

13. The interactive cord system of claim 1, wherein the sensing circuitry comprises:
an internal electronics module coupled with the interactive cord; and.
a removable electronics module communicatively coupled with the internal electronics module.

14. The interactive cord system of claim 1, wherein:
the touch-sensitive area is formed along a first longitudinal portion of the interactive cord; and
the plurality of sensing conductive lines is not exposed along an outer surface of an outer layer of the interactive cord along a second longitudinal portion of the interactive cord to form a non-touch-sensitive area along the second longitudinal portion of the interactive cord.

15. An interactive object, comprising:
sensing circuitry coupled to a system ground;
an interactive cord, a plurality of non-conductive lines, and a plurality of conductive sensing lines at least partially woven with one or more of the plurality of non-conductive lines to form at least one touch-sensitive area along the interactive cord; and
a grounding object configured to provide capacitive coupling with a user of the interactive object, the grounding object electrically connected with the system ground of the sensing circuitry.

16. The interactive object of claim 15, further comprising one or more conductive grounding lines electrically connected with the system ground of the sensing circuitry.

17. The interactive object of claim 15, wherein the one or more conductive grounding lines extend at least partially along the interactive cord in a longitudinal direction.

18. The interactive object of claim 15, wherein the grounding object comprises at least one of a plurality of conductive fibers, a conductive block, a conductive sheet, or a conductive foil.

19. A method for forming an interactive cord system, the method comprising:
forming a plurality of conductive sensing lines together with one or more of a plurality of non-conductive lines to form a touch-sensitive area of an interactive cord;
arranging one or more conductive grounding lines to extend at least partially along the interactive cord in a longitudinal direction of the interactive cord; and
directly electrically connecting the one or more conductive grounding lines with a system ground of sensing circuitry configured to detect a change in capacitance associated with the plurality of conductive sensing lines.

20. The method of claim 19, further comprising directly electrically connecting the one or more of the conductive grounding lines with a grounding fabric that is configured to provide capacitive coupling with a user.

* * * * *